US008495015B2

(12) United States Patent
Freedman

(10) Patent No.: US 8,495,015 B2
(45) Date of Patent: *Jul. 23, 2013

(54) PEER-TO-PEER SYNCING IN A DECENTRALIZED ENVIRONMENT

(75) Inventor: Gordie Freedman, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 669 days.

This patent is subject to a terminal disclaimer.

(21) Appl. No.: 12/207,602

(22) Filed: Sep. 10, 2008

(65) Prior Publication Data

US 2009/0006498 A1    Jan. 1, 2009

Related U.S. Application Data

(63) Continuation-in-part of application No. 11/157,647, filed on Jun. 21, 2005, now Pat. No. 7,523,146.

(51) Int. Cl.
G06F 7/00 (2006.01)
G06F 17/00 (2006.01)

(52) U.S. Cl.
USPC .......................................... 707/622; 707/638

(58) Field of Classification Search
None
See application file for complete search history.

(56) References Cited

U.S. PATENT DOCUMENTS

| 4,467,419 A | 8/1984 | Wakai |
|---|---|---|
| 4,558,413 A | 12/1985 | Schmidt et al. |
| 4,631,673 A | 12/1986 | Haas et al. |
| 4,761,737 A | 8/1988 | Duvall et al. |
| 4,792,909 A | 12/1988 | Serlet |
| 4,953,080 A | 8/1990 | Dysart et al. |
| 5,163,148 A | 11/1992 | Walls |
| 5,175,849 A | 12/1992 | Schneider |
| 5,201,044 A | 4/1993 | Frey, Jr. et al. |

(Continued)

FOREIGN PATENT DOCUMENTS

| DE | 39 19 802 A1 | 12/1989 |
|---|---|---|
| EP | 0 339 221 A2 | 11/1989 |

(Continued)

OTHER PUBLICATIONS

Detection of MutualInconsistency in Distributed Systems, Parker et al., IEEE Transactions on Software Engineering, vol. SE-9, No. 3, May 1983.*

(Continued)

*Primary Examiner* — Augustine K Obisesan
(74) *Attorney, Agent, or Firm* — Park, Vaughan, Fleming & Dowler, LLP

(57) ABSTRACT

An apparatus and method of synchronizing a datum between a plurality of stores uses version vectors associated with the datum in each store. Each version vector has one or more entries, and each entry has an identifier and a value. The identifier identifies a store that has modified the datum, and the value indicates a number of modifications to the datum made by the store. When synchronizing the datum between stores, the version vectors of the datum are compared to determine whether one version vector is subordinate to another version vector. The datum in the store having the subordinate version vector is then replaced with the datum having the dominant version vector. When compared, a conflict resolution by a user is required if the version vectors are not identical, if the version vectors do not have all the same identifiers, and if one version vector does not contain all of the identifiers with equal or greater values of those in the other version vector.

35 Claims, 9 Drawing Sheets

U.S. PATENT DOCUMENTS

| | | | |
|---|---|---|---|
| 5,276,860 A | 1/1994 | Fortier et al. | |
| 5,287,496 A | 2/1994 | Chen et al. | |
| 5,355,483 A | 10/1994 | Serlet | |
| 5,369,757 A | 11/1994 | Spiro et al. | |
| 5,375,232 A | 12/1994 | Legvold et al. | |
| 5,379,412 A | 1/1995 | Eastridge et al. | |
| 5,381,545 A | 1/1995 | Baker et al. | |
| 5,386,554 A | 1/1995 | Nozaki | |
| 5,403,639 A | 4/1995 | Belsan et al. | |
| 5,454,103 A | 9/1995 | Coverston et al. | |
| 5,481,721 A | 1/1996 | Serlet et al. | |
| 5,487,160 A | 1/1996 | Bemis | |
| 5,490,246 A | 2/1996 | Brotsky et al. | |
| 5,594,900 A | 1/1997 | Cohn et al. | |
| 5,603,020 A | 2/1997 | Hashimoto et al. | |
| 5,627,996 A | 5/1997 | Bauer | |
| 5,636,359 A | 6/1997 | Beardsley et al. | |
| 5,636,360 A | 6/1997 | Courts et al. | |
| 5,642,501 A | 6/1997 | Doshi et al. | |
| 5,664,177 A | 9/1997 | Lowry | |
| 5,664,186 A | 9/1997 | Bennett et al. | |
| 5,687,370 A | 11/1997 | Garst et al. | |
| 5,710,900 A | 1/1998 | Anand et al. | |
| 5,710,922 A | 1/1998 | Alley et al. | |
| 5,727,202 A | 3/1998 | Kucala | |
| 5,742,752 A | 4/1998 | DeKoning | |
| 5,758,358 A | 5/1998 | Ebbo | |
| 5,764,972 A | 6/1998 | Crouse et al. | |
| 5,765,171 A * | 6/1998 | Gehani et al. | 1/1 |
| 5,771,379 A | 6/1998 | Gore, Jr. | |
| 5,778,411 A | 7/1998 | DeMoss et al. | |
| 5,806,078 A * | 9/1998 | Hug et al. | 715/205 |
| 5,819,275 A | 10/1998 | Badger et al. | |
| 5,832,489 A | 11/1998 | Kucala | |
| 5,884,323 A | 3/1999 | Hawkins et al. | |
| 5,918,229 A | 6/1999 | Davis et al. | |
| 5,946,689 A | 8/1999 | Yanaka et al. | |
| 5,991,771 A | 11/1999 | Falls et al. | |
| 6,000,000 A | 12/1999 | Hawkins et al. | |
| 6,006,231 A | 12/1999 | Popa | |
| 6,006,274 A | 12/1999 | Hawkins et al. | |
| 6,026,415 A | 2/2000 | Garst et al. | |
| 6,098,079 A * | 8/2000 | Howard | 1/1 |
| 6,101,615 A | 8/2000 | Lyons | |
| 6,151,659 A | 11/2000 | Solomon et al. | |
| 6,188,995 B1 | 2/2001 | Garst et al. | |
| 6,233,648 B1 | 5/2001 | Tomita | |
| 6,240,414 B1 | 5/2001 | Beizer et al. | |
| 6,272,558 B1 | 8/2001 | Hui et al. | |
| 6,275,831 B1 | 8/2001 | Bodnar et al. | |
| 6,292,803 B1 | 9/2001 | Richardson et al. | |
| 6,295,541 B1 | 9/2001 | Bodnar et al. | |
| 6,304,884 B1 | 10/2001 | Garst et al. | |
| 6,308,201 B1 | 10/2001 | Pivowar et al. | |
| 6,311,193 B1 | 10/2001 | Sekido | |
| 6,317,754 B1 * | 11/2001 | Peng | 707/610 |
| 6,330,618 B1 | 12/2001 | Hawkins et al. | |
| 6,353,837 B1 | 3/2002 | Blumenau | |
| 6,360,272 B1 | 3/2002 | Lincke et al. | |
| 6,389,423 B1 | 5/2002 | Sakakura | |
| 6,393,434 B1 * | 5/2002 | Huang et al. | 1/1 |
| 6,397,311 B1 | 5/2002 | Capps | |
| 6,401,112 B1 | 6/2002 | Boyer et al. | |
| 6,446,088 B1 * | 9/2002 | Vaduvur et al. | 1/1 |
| 6,457,062 B1 | 9/2002 | Pivowar et al. | |
| 6,466,950 B1 | 10/2002 | Ono | |
| 6,505,215 B1 | 1/2003 | Kruglikov et al. | |
| 6,516,327 B1 | 2/2003 | Zondervan et al. | |
| 6,539,381 B1 | 3/2003 | Prasad et al. | |
| 6,553,037 B1 | 4/2003 | Pivowar et al. | |
| 6,571,262 B2 | 5/2003 | Garst et al. | |
| 6,651,137 B2 | 11/2003 | Baek et al. | |
| 6,654,772 B1 | 11/2003 | Crow et al. | |
| 6,671,772 B1 | 12/2003 | Cousins | |
| 6,717,599 B1 | 4/2004 | Olano | |
| 6,748,504 B2 | 6/2004 | Sawdon et al. | |
| 6,757,896 B1 * | 6/2004 | Cohen et al. | 718/100 |
| 6,775,679 B2 | 8/2004 | Gupta | |
| 6,823,336 B1 | 11/2004 | Srinivasan et al. | |
| 6,829,617 B2 | 12/2004 | Sawdon et al. | |
| 6,868,417 B2 | 3/2005 | Kazar et al. | |
| 6,901,479 B2 | 5/2005 | Tomita | |
| 6,925,477 B1 | 8/2005 | Champagne et al. | |
| 6,981,171 B2 | 12/2005 | Hashemi | |
| 6,983,277 B2 | 1/2006 | Yamaguchi et al. | |
| 7,043,637 B2 | 5/2006 | Bolosky et al. | |
| 7,085,784 B2 | 8/2006 | Krishna et al. | |
| 7,085,785 B2 | 8/2006 | Sawdon et al. | |
| 7,149,761 B2 | 12/2006 | Cooke et al. | |
| 7,181,521 B2 | 2/2007 | Knauerhase et al. | |
| 7,216,135 B2 | 5/2007 | Sawdon et al. | |
| 7,216,199 B2 | 5/2007 | Mizuno | |
| 7,216,289 B2 | 5/2007 | Kagle et al. | |
| 7,290,019 B2 | 10/2007 | Bjorner et al. | |
| 7,406,499 B2 | 7/2008 | Singh et al. | |
| 7,426,563 B2 | 9/2008 | Morita et al. | |
| 7,430,640 B2 | 9/2008 | Schmuck et al. | |
| 7,502,801 B2 | 3/2009 | Sawdon et al. | |
| 7,506,007 B2 | 3/2009 | Bjorner | |
| 7,523,146 B2 | 4/2009 | Holt et al. | |
| 7,606,881 B2 | 10/2009 | Chasman et al. | |
| 7,610,387 B1 * | 10/2009 | Liskov et al. | 709/227 |
| 7,657,769 B2 | 2/2010 | Marcy et al. | |
| 7,680,834 B1 | 3/2010 | Sim-Tang | |
| 7,728,823 B2 | 6/2010 | Lyon et al. | |
| 7,730,026 B2 | 6/2010 | Serlet | |
| 7,760,767 B2 | 7/2010 | Nilo et al. | |
| 7,769,717 B2 | 8/2010 | Federwisch et al. | |
| 7,778,963 B2 | 8/2010 | Novik | |
| 7,809,682 B2 | 10/2010 | Paterson et al. | |
| 7,814,231 B2 | 10/2010 | Paterson et al. | |
| 7,860,826 B2 | 12/2010 | Freedman et al. | |
| 7,917,471 B2 | 3/2011 | Balandin | |
| 2002/0049764 A1 | 4/2002 | Boothby et al. | |
| 2003/0093431 A1 | 5/2003 | Cooke et al. | |
| 2003/0131004 A1 | 7/2003 | Krishna et al. | |
| 2004/0177100 A1 * | 9/2004 | Bjorner et al. | 707/206 |
| 2004/0186916 A1 * | 9/2004 | Bjorner | 709/248 |
| 2004/0193952 A1 | 9/2004 | Narayanan et al. | |
| 2004/0214926 A1 | 10/2004 | Bittner | |
| 2005/0015436 A1 * | 1/2005 | Singh et al. | 709/203 |
| 2005/0271304 A1 * | 12/2005 | Retterath et al. | 382/305 |
| 2006/0031587 A1 | 2/2006 | Paterson et al. | |
| 2006/0041603 A1 | 2/2006 | Paterson et al. | |
| 2006/0066588 A1 | 3/2006 | Lyon et al. | |
| 2006/0069809 A1 * | 3/2006 | Serlet | 709/248 |
| 2006/0242444 A1 * | 10/2006 | Novik et al. | 713/400 |
| 2006/0288053 A1 | 12/2006 | Holt et al. | |
| 2007/0180075 A1 * | 8/2007 | Chasman et al. | 709/223 |
| 2008/0005195 A1 | 1/2008 | Li | |
| 2008/0034009 A1 | 2/2008 | Freedman et al. | |
| 2008/0165807 A1 | 7/2008 | Nilo et al. | |
| 2008/0168183 A1 | 7/2008 | Marcy et al. | |
| 2008/0294701 A1 * | 11/2008 | Saraswati et al. | 707/203 |

FOREIGN PATENT DOCUMENTS

| | | |
|---|---|---|
| EP | 0 341 037 A2 | 11/1989 |
| EP | 0 501 160 A2 | 9/1992 |
| EP | 0 566 966 A2 | 10/1993 |
| EP | 0 278 313 B1 | 8/1994 |
| EP | 0 679 028 A2 | 10/1995 |
| EP | 0 238 158 B1 | 12/1995 |
| EP | 0 694 879 A2 | 1/1996 |
| EP | 0 840 242 A2 | 10/1996 |
| EP | 1 246 061 A2 | 10/2002 |
| EP | 1 383 080 A1 | 1/2004 |
| GB | 2 218 833 A | 11/1989 |
| JP | 2000/122907 | 4/2000 |
| JP | 2000/299698 | 10/2000 |
| JP | 2003-330827 | 11/2003 |
| JP | 2004/86800 | 3/2004 |
| JP | 2005-507130 | 3/2005 |
| WO | 93/08529 A1 | 4/1993 |
| WO | 98/20419 A1 | 5/1998 |
| WO | WO 98/45815 A1 | 10/1998 |
| WO | 99/13403 A1 | 3/1999 |
| WO | 99/63441 A1 | 12/1999 |

| | | |
|---|---|---|
| WO | WO 01/06364 A2 | 1/2001 |
| WO | 03/036541 | 5/2003 |
| WO | WO 2005/112388 A1 | 11/2005 |

OTHER PUBLICATIONS

Communication Timestamps for File System Synchronization, Cox et al., 2001.*

Abuan et al.; U.S. Appl. No. 10/769,841, filed Feb. 2, 2004.

Demers et al.; "Epidemic Algorithms for Replicated Database Maintenance;" Xerox Palo Alto Research Center; (c) 1987.

Patent Cooperation Treaty International Search Report received in International Application No. PCT/US2005/022930 mailed Oct. 27, 2005.

Babaoğlu et al.; "Consistent Global States of Distributed Systems: Fundamental Concepts and Mechanisms;" Technical Report UBLCS-93-1; Jan. 1993; Laboratory for Computer Science University of Bologna.

Benford, "Dynamic Definition of Entries and Attributes in the Directory Service," IEEE 1988.

Chang et al., "Extended K-d Tree Database Organization: A Dynamic Multiattribute Clustering Method," IEEE Transactions on Software Engineering, vol. SE-7, No. 3, May 1981.

Chen et al., "A Performance Evaluation of RAID Architectures," IEEE Transactions on Computers, vol. 45. No. 10, Oct. 1996.

Chen et al., "Schemes for Snapshot Advancement for Multiversion Concurrency Control," IBM TDB May 1992.

Coley, "Support of a Dynamically managed Device Switch Table on a Unix Operating System," IBM TDB May 1992.

Com, "Dynamic Memory Estimation for Database Monitor Snapshot," IBM TDB Mar. 1993.

Condry et al., "The Object-Oriented Advantage in Prototyping a Remote File System," In Proceedings Second International Workshop on Object-Orientation in Operating Systems, pp. 190-199, Paris, France, Sep. 1992.

Cruz et al., "Dunes: A Performance-Oriented System Support Environment for Dependency Maintenance in Workstation Networks," IEEE 1999.

Duvall et al., "Database Server Journal Backup Automation Technique," IBM TDB Feb. 1993.

Emma et al., "Exclusive Use Directory and Inode Caching," IBM TDB Dec. 1989.

Gait, "Stability, Avaliability, and Response in network File service," IEEE Transactions on software Engineering, vol. 17, No. 2, Feb. 1991.

Greene, "Indicating the 'File Types' in the Files window of a User-Interactive Display System," IBM TDB Nov. 1986.

Helary et al., "Computing Particular Snapshots in Distributed Systems," IBM TDB Mar. 1988.

Henson, "Managing Executing Files in a Virtual file System," IBM TDB Mar. 1988.

Heyrman et al., "Storage management Mechanism for Managing Snapshot Pages," IBM TBD Sep. 1992.

Honishi et al., "An Index Structure for Parallel Database Processing," IEEE 1992.

Hsieh et al., "Performance Evaluation of Software RAID vs. Hardware RAID for Parallel Virtual File System," Proceedings in Parallel and Distributed Systems 2002.

Hua et al., Improving RAID Performance Using a Multibuffer Technique, Proceedings 15th International Conference on Data Engineering, Mar. 23-26, 1999.

Hwang et al., "Reliable Cluster computing with a New Checkpoint RAID-Xarchitecture," Proceedings of Heterogenous Computing Workshop, 2000.

Hwang et al., "Orthogonal Striping and Morroring in a Distributed RAID for I/O-Centric Cluster Computing," IEEE Transactions on Parallel and Distributed Systems, vol. 13, No. 1, Jan. 2002.

Jin et al., "Improving Partial Stripe Write Performance in RAID Level 5," IEEE 1998.

Jonge et al., "Concurrent Access to B-trees," IEEE 1990.

Kashyap et al., "Analysis of the Multiple-Attribute-Tree Data-Base Organization," IEEE Transactions on Software Engineering, vol. SE-3, No. 6, Nov. 1977.

Kumar, "Coping with Conflicts in a Optimistically Replicated File System," Proceedings on the Management of Replicated Data 1990.

Mogi et al., "Dynamic Parity Stripe Reorganizations for RAIDs Disk Arrays," IEEE 1994.

Park et al., "Striping in Disk Array RM2 Enabling the Tolerance of Double Disk Failures," IEEE 1996.

Pilarski et al., "Checkpointing for Distributed Databases: Starting From the Basics," IEEE Transactions on the Parallel and Distributed Systems, vol. 3, No. 5, Sep. 1992.

Santry, "Elephant: the File System That Never Forgets," Proceedings of the Seventh Workshop on Hot Topics in Operating Systems, 1999.

Sechrest et al., "Blending Hierarchical and Attribute-Based File Naming," IEEE 1992.

Venkatesan, "Message-Optimal Incremental Snapshots," IEEE 1989.

Watanabe et al., "Eliminate Information Inconsistency for X.500 Directory," IEEE 1994.

Yang et al., "Global Snapshots for Distributed Debugging," IEEE 1992.

Holt, "Apparatus and Method for Peer-to-Peer N-Way Synchronization in a Decentralized Environment." U.S. Appl. No. 11/157,647, filed Jun. 21, 2005.

* cited by examiner

PEER-TO-PEER SYNCING IN A DECENTRALIZED ENVIRONMENT

CROSS-REFERENCE TO RELATED APPLICATIONS

This is a continuation-in-part of U.S. application Ser. No. 11/157,647, filed 21 Jun. 2005, entitled "Apparatus and Method for Peer-to-Peer N-Way Synchronization in a Decentralized Environment," which is incorporated herein by reference in its entirety and to which priority is claimed.

BACKGROUND

FIG. 1 shows various devices that a user may own and use. These devices include, but are not limited to, a computer 100, a portable device 110, a personal digital assistant 120, a cellular phone (not shown), etc. The user may have several such devices that store various forms of information, such as contacts, calendar dates, documents, notes, etc. In using these devices, the user may synchronize a set of information stored on one device with the same set of information stored on another device. As expected, this synchronization process seeks to maintain consistency between the sets of information.

For example, the desktop computer 100 may have personal information management ("PIM") data (e.g., contacts, calendar dates, etc.). At some point, the user of that desktop computer 100 may want to use that PIM data when she is away from her desktop computer 100, and she may want to access the PIM data while using her portable device 110 or PDA 120. To provide that ability, her portable device 110 and PDA 120 may each carry their own copies of the PIM data that correspond to the PIM data on the desktop computer 100. Because each of these devices 100, 110, and 120 could potentially have different copies (versions) of the same PIM data that have been added, changed, updated, etc. at different times and in different ways, it may be necessary for the user to synchronize the PIM data between devices so the user can have a common view of her PIM data on each device.

A common technique for synchronizing devices uses snapshots of data at a point-in-time and compares current data to the snapshot to determine what has changed. For example, the computer 100 may have a database 102 that stores the current PIM data edited or added on the computer 100. The computer 100 may also have a snapshot database 104 that is a snapshot of the PIM data taken at some previous point-in-time. Typically, the previous point-in-time is when a prior or most recent synchronization took place. Similarly, the portable device 110 has a database 112 for current PIM data. Having these structures in place, the user may attempt to synchronize the computer 100 and the portable device 110. The typical synchronization technique compares both the portable's database 112 and the computer's database 102 with the snapshot database 104 on the computer 100. During the compare operation, the synchronization technique assembles a list of data items that are new or changed in the active databases 102 and 112 as compared to the snapshot database 104. Finally, to finish out the synchronization, the synchronization technique uses the list of new and changed data to update all three databases 102, 104, and 112.

This synchronization technique experiences problems when information is inconsistently changed on both the computer 100 and the portable device 110. For example, before synchronization, the user may have change Jane Doe's phone number on the computer 100 to 877-555-5555 and may have changed Jane Doe's phone number on the portable device 110 to 800-555-5555. During the compare operation of the synchronization, the synchronizing system will notice this discrepancy and identify a conflict. In the current art, there is generally no elegant way to resolve this conflict with certainty. Some synchronization techniques present an interface to the user and ask her to choose between the two pieces of data. Unfortunately, even the user may not remember which piece of data is correct. Other synchronization techniques simply create duplicate entries in each database 102/112 having both possible data items on the two devices 100 and 110.

Problems with conflicting data are exacerbated if there are more than two devices carrying corresponding data sets. In FIG. 1, for example, the computer 100 may be synchronized with the PDA 120 after first synchronizing with the portable device 110. During synchronization, the PDA 120 may carry Jane Doe's phone number as yet a different value of 888-555-555, thus presenting a conflict with the phone number carried in both the computer 100 and the portable device 110. Unfortunately, in the prior art, there is no elegant solution for determining the correct result with certainty. Furthermore, even if the correct result can be determined at the time of synchronization (e.g., by the user, who remembers the correct number), the synchronizing system may simply have the same conflict problem again the next time the portable device 110 is synchronized.

In the above description of FIG. 1, none of the devices has a master database containing all of the up-to-date data items that can then be used as a centralized repository from which to synchronize with all other devices. As such, this form of arrangement represents a peer-to-peer system in a decentralized environment. In general, in such a peer-to-peer system with three or more peers (e.g., devices) where the peers may synchronize with each other two at a time and where there is no centralized repository, there is no way to know whether one of the peers carries more up-to-date data than the other peer.

Notably, a simple timestamp cannot resolve a conflict between data items on the syncing peers with certainty as a matter of practical human usage. If, for example, two corresponding data items have been changed over the past days or months at first and second peers, the time when those changes occurred does not necessarily mean that the "later" time stamped change is correct. This is especially true if the "later" change actually occurred as a result of synchronization with a third peer, which itself may have received its data change long ago. Furthermore, each peer must have the same clock value to make any comparison of timestamps effective.

Therefore, in the decentralized peer-to-peer system merely using time-related information, the synchronization system would be unable to determine whether a detected conflict is a true conflict that must be resolved by the user on the one hand or whether the detected conflict is an apparent conflict that could be verifiably resolved if the system understood the history of the data on the other hand. To understand the history of the data, however, the synchronization system may need to store a great deal of information related to the history of the data, making the synchronization system cumbersome and complex.

In view of the these and other problems existing in the art, what is needed is a synchronization system that is capable of hubless or decentralized syncing in a peer-to-peer system where any number of users and devices can come and go in the system without coordination and where no one device knows the existence of all other devices. What is also needed is a synchronization system that associates lightweight history information with each piece of data and that does not require a universal timestamp or coordinated logical clock common to all peers to perform synchronizations.

DETAILED DESCRIPTION

Synchronization techniques disclosed herein can be used in a decentralized environment having various peers (stores) that can be synched together without any central repository of information. The disclosed synchronization techniques are based on version vectors (e.g., histories of the modifications made to a copy or version of synchronized information). In this form of synchronizing, datums (e.g., files, contact names, phone numbers, calendar entries, etc.) are synchronized between a plurality of stores or peers (e.g., machines, devices, databases, etc.) by tracking a version vector for each datum. The version vector is associated with or attached to the datum at the stores, and the datum's version vector travels with the datum from store to store during synchronization, copying, or the like. The version vector can be associated or attached to the data using techniques disclosed herein or by using techniques known in the art for associating or attaching metadata to underlying data. The version vector is preferably lightweight and associates or attaches as little information as necessary to the datum. Details of these version vectors and the synchronization techniques that use them are disclosed in more detail below. Additional details are also provided in co-pending U.S. patent application Ser. No. 11/157,647, filed 21 Jun. 2005, which is incorporated herein by reference in its entirety.

A. Embodiment and Example of a Version Vector

Figure 1:
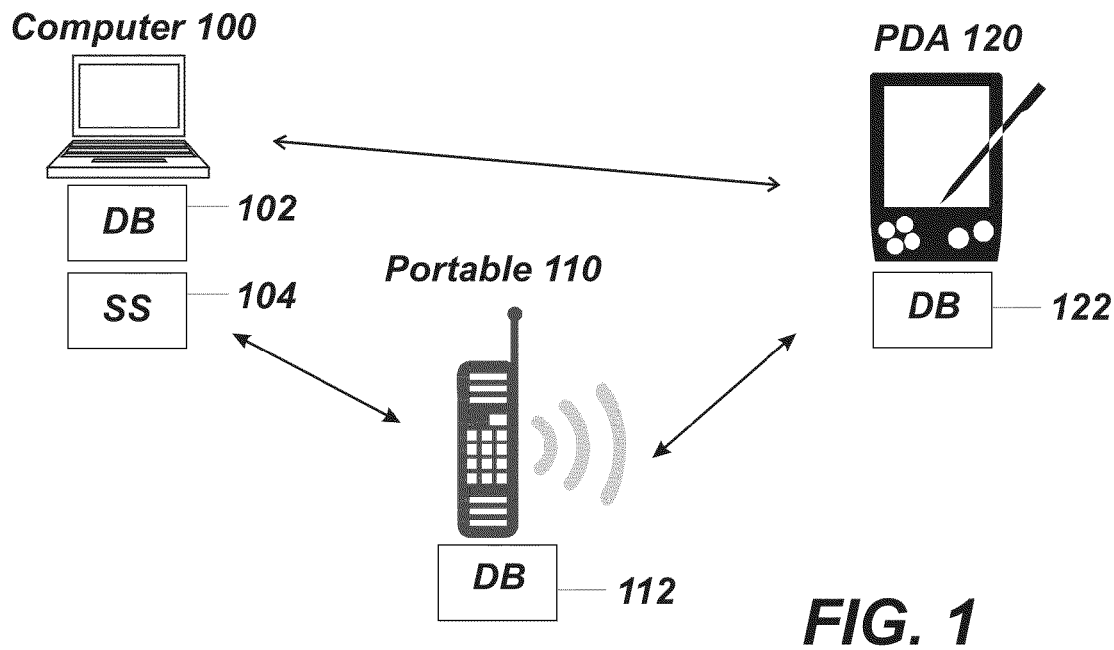
FIG. 1 shows devices that may be synchronized.
Figure 2:
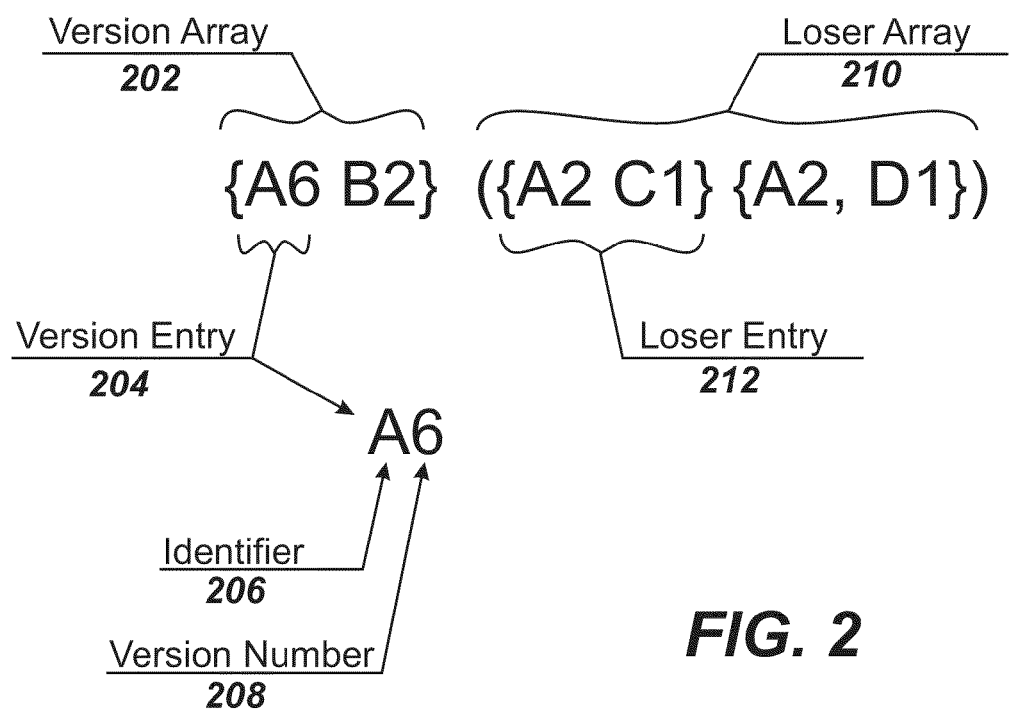
FIG. 2 is an embodiment of a version vector for a datum according to certain teachings of the present invention.

An example version vector 200 is shown in FIG. 2. The version vector 200 uniquely identifies the history of a given datum by indicating the modifications made to it in various stores (but not necessarily all stores). When the datum is modified, the version vector 200 is updated to reflect the fact that the datum has been modified while in that particular store.

In FIG. 2, the example version vector 200 is "{A6 B2} ({A2 C1} {A2 D1})." The version vector 200 includes a version array 202 "{A6 B2}" and includes a loser array 210 "({A2 C1} {A2 D1})." The version array 202 is the primary part of the version vector 200 and uniquely identifies the history of the associated datum by indicating the modifications made to the datum while in various stores (but not necessarily all stores). Therefore, the version array 202 "{A6 B2}" includes one version entry 204 (i.e., A6 and B2) for each store (i.e., A and B) in which the given datum has been changed.

Each version entry 204 (e.g., A6) includes a unique store identifier 206 (e.g., A) and a version number 208 (e.g., 6) concatenated together to create a unique version entry representing a particular change at a particular store to that particular datum. The unique store identifier 206 can take various forms, and examples of a unique store identifier 206 include, but are not limited to, a machine ID; a globally unique identification (GUID) number; a network, IP, or Ethernet address; or other universally unique identification that can be used to uniquely identify a store. The number of bits used to implement the store identifier 206 should be enough to guarantee unique representation among all possible stores, and the number of bits used to implement a version number should be sufficient to represent the largest possible (integer) number of changes to a datum. In the present disclosure, the unique store identifier 206 may be referred to as a store ID or machine ID. For simplicity, the unique store identifiers 206 in the present examples are simply represented by single letters A, B, C, etc., but may actually have the form of machine IDs or the like.

The version number 208 can be similar to a generation count, but unlike a generation count it is not universally representative of the changes made to the datum across all possible stores. Rather, the version number 208 indicates the number of changes made to the associated datum while at the store with which the version number 208 is associated. Thus, different datums at the various stores in a decentralized environment can have the same version number 208, but the store identifiers 206 are unique to each store. In a preferred embodiment, the version number 208 is a monotonically increasing integer. In the present examples, the version numbers 208 are integers beginning with "1."

As noted above, the version array 202 is associated with the datum and uniquely identifies the history of changes made to the datum while on one or more stores. In the present example, the version array 202 shows that the datum to which the version array 202 is associated has been modified at store A and at store B. It may represent, for example, that the user has changed a phone number (the datum) in an address program at store A, such that its version number at store A is now 6, and that the user has also changed (at some other point in time) the same phone number at store B, such that its version number at store B is now 2. Here, the two version entries 204 are stored together in the version array 202 "{A6 B2}," indicating as well that the datum has at some point been synchronized between stores A and B.

In addition to the version array 202, the version vector 200 for the datum includes a loser array 210, which in the present example is "({A2 C1} {A2 D1})." The loser array 210 may or may not be present in a given datum's version vector, depending on the synchronizations and resolved conflicts made by the user as discussed below. When the loser array 210 is present (i.e., not empty), it contains one or more version arrays 212, each of which is identical in format found in the primary version array 202. The version array 212 is placed in the loser array 210 when a primary version array 202 of the datum has lost a conflict (i.e., was not chosen by the user) as a result of a user conflict resolution during synchronization. More details of the loser array 210 are discussed below.

As the datum is synced between stores, the version vector 200 for the datum in one store is compared to the version vector 200 for the same datum in another store. The result of comparing the two version vectors 200 indicates whether the two copies (versions) of the datum need to be synced and, if so, which of the two copies of the datum has precedence (i.e., which of the two copies is dominant and which is subordinate). Although the comparison between version vectors 200 is described in more detail below, the comparison in general can be performed by directly comparing the primary version arrays 202 of the version vectors 200 of the datum and algorithmically determining which of the version vectors 200 is newer, more recent, or more up-to-date (i.e., determine which version array 202 evidences further modifications to the datum beyond those of the other version array). If the algorithmic comparison cannot determine a strictly newer version vector, then the version vectors 200 are in conflict. In such a conflict, the comparison can be resolved with user intervention in which the user chooses which of the version vectors 200 should win the conflict. However, the conflict may still be resolved automatically by looking at the looser arrays 210 (if any) in the version vectors 200. In this form of automatic conflict resolution, the comparison determines algorithmically whether one of the primary version arrays 202 has already won a conflict with the other version vector 200 (i.e., the user by intervention chose one version vector over another). If so, that one version vector can be automatically made the winner of the conflict.

B. Exemplary Peer-to-Peer System Having a Plurality of Stores

Figure 3:
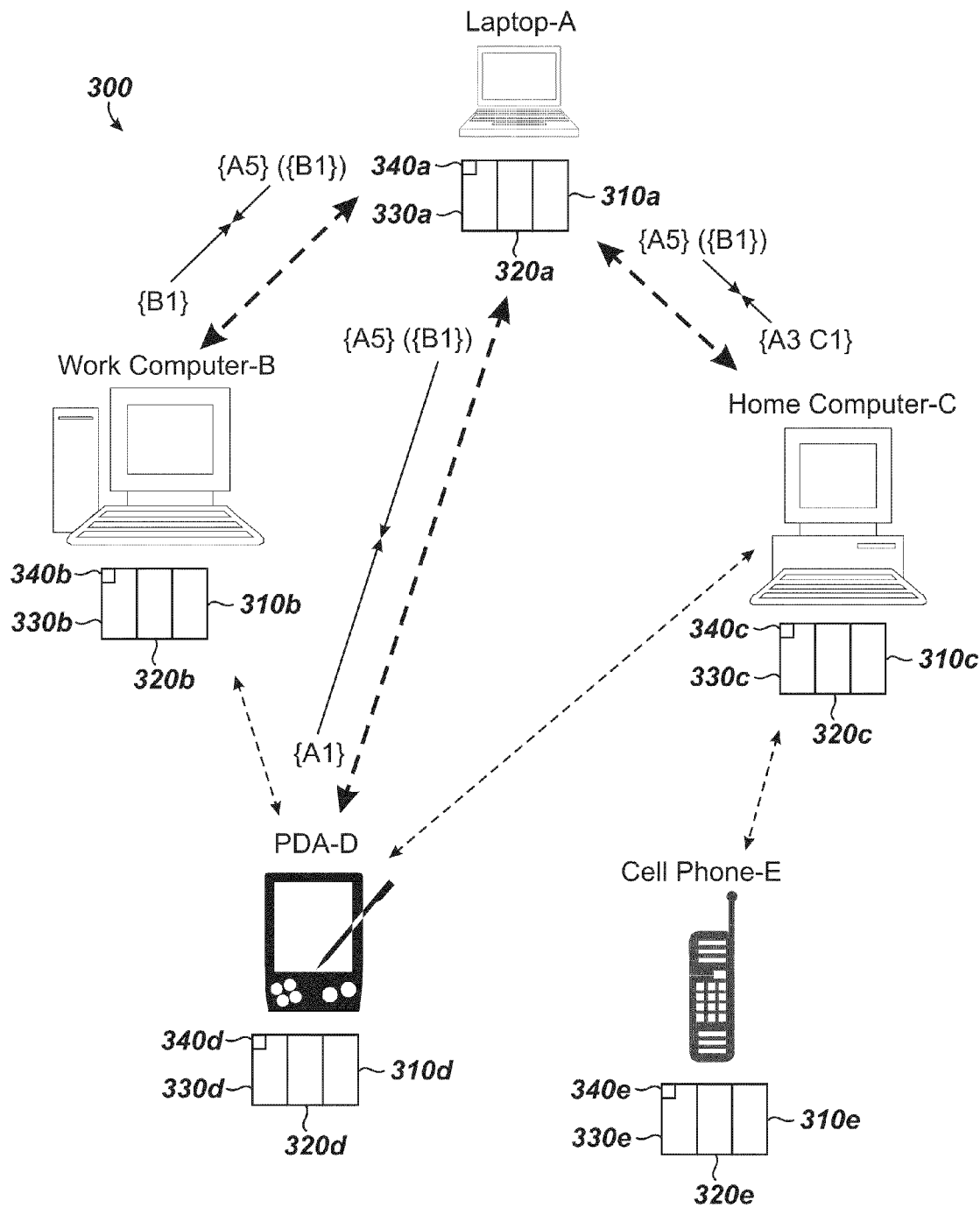
FIG. 3 is an exemplary peer-to-peer system in a decentralized environment using the disclosed version vectors and associated techniques.

Given the above overview of version vectors, discussion now turns to their use in synching between stores of a peer-to-peer system in a decentralized environment. Referring to FIG. 3, an exemplary peer-to-peer system 300 in a decentralized environment is illustrated. The system 300 includes a plurality of stores, which are devices or machines used by one or more users. In the present example, the system has five stores A, B, C, D, and E representing a laptop computer, a work computer, a home computer, a personal digital assistant (PDA), and a cell phone. The various stores (computers, PDA, cell phone, etc.) can be connected with one another using various techniques known in the art. Each store A-E has synchronization hardware/software 310 for synchronizing datums between stores, and each store A-E also has versioning software 320 for storing, updating, and comparing version vectors, among other processes according to certain teachings of the present disclosure. In addition, each store A-E in the present example has an address program 330 having a particular phone number (datum) 340, which can be modified by the store A-E and synchronized between stores.

As will be evident, a user can make changes to a datum (e.g., a file, phone number, address, calendar entry, etc.) on various stores when working with the datum. In a hubless or decentralized peer-to-peer system, a "master" version of the datum is not stored on a hub or central store, and the various stores are not guaranteed to be in sync with one another while the user makes changes to the datum. For example, the user can modify the phone number (datum) 340 on any one of the stores A-E, and the stores A-E can be connected and synchronized in any number of combinations and at different times. Thus, it is preferred to minimize the number of conflicts requiring the user to choose one version of the phone number 340 over another. This is the reason for including loser arrays in the version vectors, as discussed briefly in FIG. 2. Furthermore, it is preferred that any version vector associated with the datum 340 be lightweight to reduce the overhead of information associated with or attached to the datum.

In a brief scenario of the peer-to-peer system 300, the phone number (datum) 340*a* can be modified with the address program 330*a* on laptop-A. The version vector associated with the phone number 340*a* is modified by the versioning process 320*a* to reflect the fact that the phone number 340*a* has been modified by the laptop-A. Using the synchronization hardware/software 310*a-b*, the user can synchronize the laptop-A with the PDA-D, which may have its own version of the phone number 340*d*. During the synchronizations, the versioning software 320 compares the version vectors of the phone number 340 on the stores A and D.

As noted previously, a newer version vector on one store will have precedence over an older version vector on another store when synchronizing the phone number (datum) 340 between stores having different versions of the datum. In such a situation, the phone number 340 with the older version vector can be automatically replaced by the phone number 340 with the newer version vector without the need for user intervention. The comparison of the version vectors 200 between stores uses the version arrays 202 and possibly the loser arrays 210, such as described above with reference to FIG. 2, of each version vector to determine which has precedence. For example, for the phone number (datum) 340, laptop-A can have version vector {A5} ({B1}), and PDA-D can have version vector {A1}. If laptop-A is synced with PDA-D, the version array {A5} for phone number 340*a* on laptop-A is evidently newer than the version array 202 {A1} of the phone number 340*d* on PDA-D because version number 5 is greater than version number 1. Thus, phone number 340*a* on laptop-A would replace phone number 340*d* on PDA-D during the synchronization.

If, in another scenario, laptop-A is synced with work computer-B, then the version vector {A5} ({B1}) for phone number 340*a* has precedence over the version vector {B1} of phone number 340*d* on computer-B because laptop-A has the loser array ({B1}). Thus, the version {B1} on the work computer-B has already lost a conflict resolution in a past synchronization and is recognized as an outdated version of the datum. Therefore, phone number 340*a* on laptop-A would replace phone number 340*b* on work computer-B during the synchronization. In other situations, the version vectors at the stores may conflict and may require a user to select which version vector will have precedence in the synchronization. If laptop-A is synced with home computer-C in another scenario, the version vector {A5} ({B1}) for copy of the phone number 340*a* on laptop-A conflicts with the version vector {A3 C1} of the copy of the phone number 340*c* on home computer-C, but no automatic resolution can be determined. In other words, the precedence of the two version arrays {A5} and {A3 C1} is not self-evident, and the looser arrays (if any) in the version vectors do not automatically resolve the conflict. The version vector {A5} for the phone number 340*a* on laptop-A indicates that the copy of the phone number has been modified five times by laptop-A. In contrast, the version vector {A3 C1} for the phone number 340*c* on home computer-C indicates that the copy of the phone number has been modified three times by laptop-A and once by home computer-C. Thus, at some point after the third modification by laptop-A, the phone number 340 was synced between laptop-A and home computer-C and subsequently modified by computer-C. Yet, determining which copy (version) of the phone number is correct, true, newer, etc. cannot be automatically resolved. In such a conflict, the user chooses which copy (version) of the phone number wins. The user can base their selection in part on the various stores being synchronized, the datum involved, and the version vector of the datum. For example, because the user has modified the phone number on both computers A and C, the user may know which computer A or C contains the "more recent" or "truer" version of the phone number and can select the dominant copy of the phone number based on this knowledge. If the user selects laptop-A as having the winning version of the phone number, then the copy of the phone number 320*c* on computer-C is replaced with the copy of the phone number 320*a* on laptop-A, and the version vectors on both stores A and C are updated to reflect this resolution, as discussed in more detail below.

C. Algorithm for Comparing and Updating Version Vectors between Stores

Figure 4:
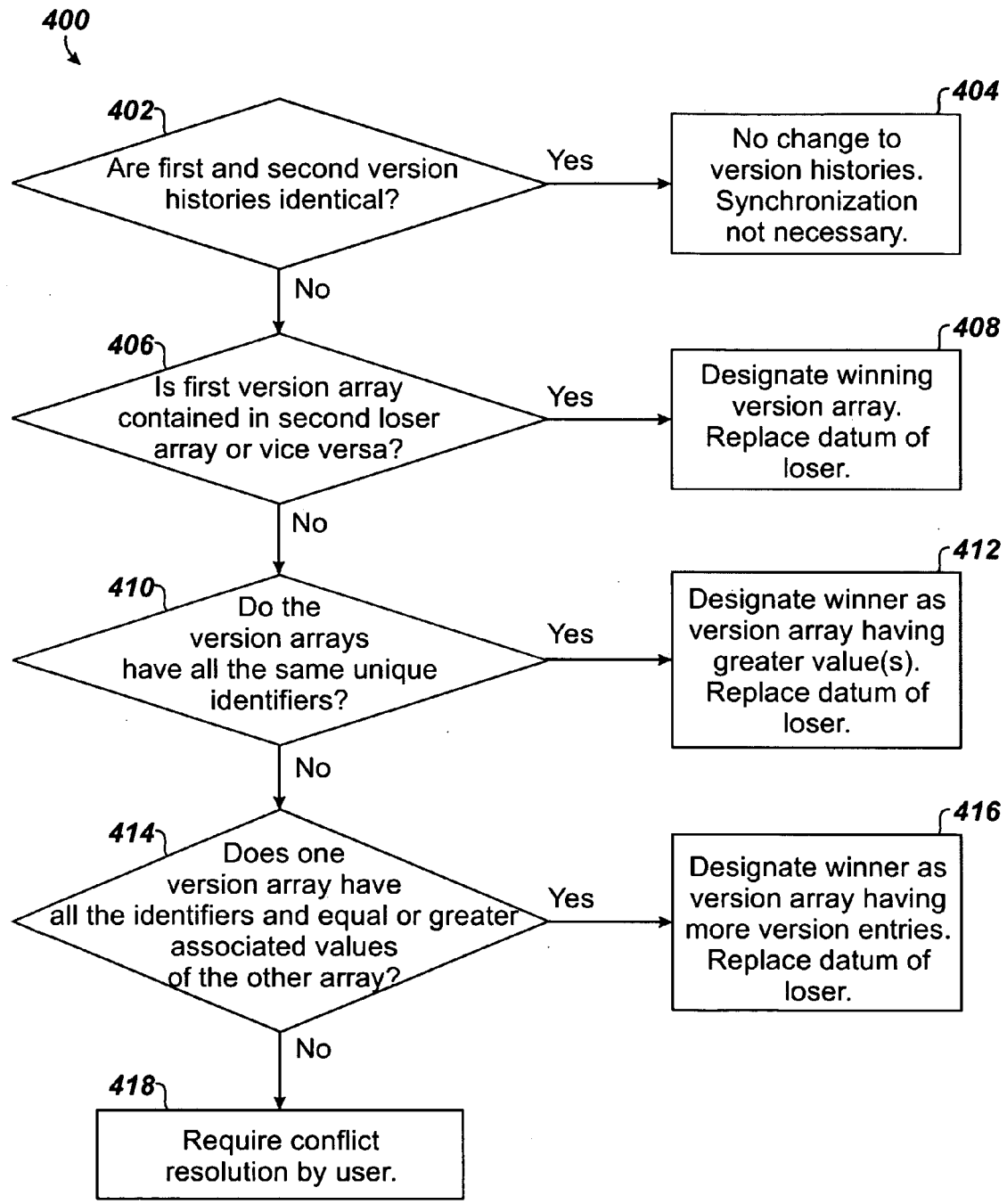
FIG. 4 is an embodiment of an algorithm for comparing the disclosed version vectors of a datum in different stores when synchronizing.

Given the previous discussions of version vectors and syncing in a decentralized peer-to-peer system, discussion now turns to techniques for comparing and updating version vectors between synchronizing stores. An algorithm 400 illustrated in FIG. 4 shows steps for comparing and updating version vectors of a datum between synchronizing stores. It is understood that the steps are illustrative and can be modified and rearranged as necessary for a given implementation.

In a first step (402), the first and second version vectors are compared when synchronizing the datum across different stores. If the version vectors are identical, then no change is made to the version vectors, and synchronization is not necessary for the particular datum (step 404). In one example scenario, a first version vector of {A1 B1} and a second version vector of {A1 B1} are identical and no synchronization is necessary. In other words, each of the same stores has modified the copy of the datum the same number of times in both version arrays. Should one of these compared version vectors with the same version arrays have a loser array while the other does not, then a resulting version vector for both stores may include that loser array in addition to the existing version array. Should the two compared version vectors with the same version arrays actually have different loser arrays, then a resulting version vector for both stores may include both of those loser arrays in addition to the existing version array.

If the comparison of step (402) fails, however, the version arrays of the version vectors are respectively compared to the loser array (if any) of the other version vector (step 406). If the first version array is contained in the second loser array, for example, then the second version array dominates the first version array, and synchronization can proceed automatically without needing a conflict resolution by the user (step 408). The version (copy) of the datum of the losing version vector is replaced, and the version vectors for the datum between the stores are made the same in both stores (step 404).

In one example scenario of step (406), a first version vector of {A1 B1} for the datum in a first store is compared to a second version vector {A1 C2} ({A1 B1}) for the datum in a second store. The second version vector {A1 C2} ({A1 B1}) is dominant because the first version array {A1 B1} is contained in the second loser array ({A1 B1}), which indicates that the first version array {A1 B1} has already lost a conflict resolution during a previous synchronization. The version (copy) of the datum in the first store is therefore replaced by the version (copy) of the datum in the second store, and both the first and second version vectors are made the same (e.g., {A1 C2} ({A1 B1})) in both stores.

If the comparison fails at step (406), the entries of the first version array are compared to entries of the second version array to determine if both arrays identify all the same stores (i.e., have all of the same unique identifiers—e.g., machine IDs) that have modified the datum in the array's entries (step 410). If they identify all of the same stores, then the values associated with the stores for each entry in the arrays are compared to determine which version array has equal or greater values for those identified stores. Having equal or greater values would indicate that its datum includes further or more recent modifications to the datum by the identified stores. The version array having the greater value or values for the entries is considered dominant over the other version array so that no conflict resolution by the user is required. Accordingly, the copy of the datum having the subordinate version vector is replaced by the copy of the datum having the dominant version vector, and the dominant version vector is associated with the datum in both stores (step 412).

In one example scenario of step (410), a first version array of {A2} is compared to a second version array of {A1}. Both entries identify all the same stores (i.e., "A") as having modified the datum, but the version arrays are not identical. The entry in the first version array has the greater value ("2") for the identified store. Therefore, the first version array is dominant. In another example scenario, a first version array of {A1 B1} is compared to a second version array of {A2 B1}. Again, both version arrays have entries that identify all of the same stores (i.e., "A" and "B") as having modified the datum, but the version arrays are not identical. The second version array {A2 B1} is dominant because its values ("2" for A and "1" for B) associated with each identified store of the entries are at least greater than or equal to the values associated with same stores of the first array, which are only "1" for A and "1" for B.

If the comparison fails at step (410), then it has already been determined that the version arrays are not identical, that one version array is not contained in the other version's loser array, and that the version arrays do not identify all of the same stores as having modified the datum. From this point, there are two possibilities between the compared version vectors. In a first possibility, a first version vector may identify all the same stores as identified by a second version vector, but the first version vector also identifies one or more additional stores indicating further modifications of the datum by other stores not performed on the version of the datum associated with the second version vector. In a second possibility, the version vectors are so disparate that user resolution is required. To handle these possibilities, the comparison algorithm determines whether one of the version arrays is essentially contained in the other version array.

In step 414, a first version array is compared to a second version array to determine if one of the version arrays identifies all of the stores identified in the other version array and whether the values associated with those same stores are equal or greater than the values associated with the same stores of the other version array (step 414). If so, the one version array is dominant, and no conflict resolution by the user is required (step 416). In one example scenario of step (414), a first version array of {A1 B1 C1} is compared to a second version array of {A1 B1}. In this example, all of the stores ("A" and "B") for the entries of the second version array {A1 B1} are also identified in the first version array {A1 B1 C1}. In addition, the values ("1" for A and "1" for B) associated with those identified stores ("A" and "B") for the entries in the second version array {A1 B1} are at least less than or equal to those in the first version array {A1 B1 C1}. Thus, the first version array {A1 B1 C1} is dominant because it at least indicates the same modifications contained in the second array (i.e., "A1 B1"), and it indicates a further modification (i.e., C1) to the datum by a store C not indicated in the second array. In another example scenario of step (414), a first version array of {A1 B1} is compared to a second version array of {A1 B2 C1}. Here, the second version array {A1 B2 C1} is dominant because entry "A1" is the same in both, entry "B2" of the second array is greater than "B1" of the first array, and the second array has entry "C1" showing that the datum contains a further modification.

D. Specific Synchronization Examples

As noted previously, various machines and devices may be synchronized with one another in a variety of combinations and at various times. One example synchronization scheme is shown the following Table 1. This example helps to illustrate how the version vectors and disclosed techniques can be used in decentralized peer-to-peer syncing where loser arrays can automatically resolve conflicts.

TABLE 1

First Example Synchronization Scheme

| Line | Store A | Store B | Store C | Store D | Explanation |
|---|---|---|---|---|---|
| 1 | {A5}({B1}) | {B1} | {C1} | {A1} | Existing version vectors in each store. |
| 2 | {A5}({B1}) | {B1} | {C1} | {A5}({B1}) | The user syncs laptop A with PDA-D, and then disconnects. Version vector for laptop A dominates. |
| 3 | {A5}({B1}) | {A5}({B1}) | {C1} | {A5}({B1}) | The user syncs laptop A with work computer-B, and then disconnects. Version vector for laptop A dominates. |
| 4 | {A5}({B1}) | {A5}({B1}) | {C1} | {A5}({B1}) | The user syncs home computer-C with PDA-D, which results in a conflict. |
| 5 | {A5}({B1}) | {A5}({B1}) | {A5}({B1}{C1}) | {A5}({B1}{C1}) | The user selects the version of the datum in PDA-D, and the version vectors are changed. |

If the comparison fails at step (414), then a conflict resolution by the user is required because the two version vectors are so disparate (step 418). Once the user selects the version of the datum, the losing version array is put into the loser array of the new version vector so that any subsequent synchronization with the losing version will not require another conflict resolution by the user. In one example scenario of step (418), a first version array of {A1 B1 C1} is compared to a second version array of {A1 D1} in the preceding steps 402, 406, 410, and 414. Neither version array is dominant over the other because (1) the version vectors are not identical, (2) neither version array is contained in a loser array of the other, and (3) one version array is not automatically determinable as dominant over or subordinate to the other. If the second version (copy) of the datum is selected by the user as being dominant, then the new version vector for the datum in the synchronized stores would be {A1 B1 C1} ({A1 D1}).

In another example scenario of step (418), a first version array of {A2 B1} is compared to a second version array {A1 B2 C1} in the preceding steps 402, 406, 410, and 414. Neither version array is dominant over the other because (1) the version vectors are not identical, (2) neither version array is contained in a loser array of the other, and (3) one version array is not automatically determinable as dominant over or subordinate to the other. Under the third criteria in particular, the conflict arises because the entry "A2" in the first version is greater than the entry "A1" in the second version, the entry "B2" in the second version is greater than the entry "B1" in first version, and the second version has entry "C1," which the first version lacks. Thus, the comparison does not give all dominant weight to one version vector, and a conflict resolution must be resolved by the user. As evidenced by this example, the disclosed comparisons between version vectors are preferably one-sided for one version vector to be dominant over the other, meaning that each entry of one version vector is at least greater than or equal to corresponding entries of the other version array. Mixed dominance between entries of the version vectors requires user intervention to resolve the conflict.

As initially shown in line 1, store A has version vector {A5}({B1}), store B has version vector {B1}, store C has version vector {C1}, and store D has version vector {A1} for the versions (copies) of a datum at the stores. In line 2, store A is synced with store D. When compared, the version vector {A5} ({B1}) for the datum on store A is dominant over the version vector {A1} on store D, because version array {A5} is greater than {A1}. Thus, the datum from store A is implemented on store D during the synchronization, and the version vectors are updated so that they both reflect a new version vector {A5} ({B1}).

In line 3, store A is synced with store B. When compared, the version vector {A5} ({B1}) for the datum on store A is dominant over the version vector {B1} of the datum on store B, because store A has the loser array ({B1}). In other words, the version {B1} on the work store B has already lost a conflict resolution in a past synchronization and is therefore an outdated version of the datum. Thus, the datum from store A is implemented on store B during the synchronization, and the version vectors are updated so that they both reflect a new version vector {A5} ({B1}). Thus, the looser array in the version vectors has been used to resolve a conflict without requiring user intervention.

As noted previously, the user may need to resolve conflicts between version vectors of the datum when synchronizing between stores. In line 4, for example, store C is synced with store D. When compared, the version vectors on the stores C and D conflict and require the user to select which version vector will dominate in the synchronization. If the user selects the version of the datum on store C, then the version vectors are updated so that they both reflect a new version vector {A5} ({B1} {C1}), as shown in line 5 of Table 1. The loser array of the new version vectors is updated to reflect that the version {C1} of the datum has lost during the conflict resolution. Thus, if another version of the datum were to have the version array {C1}, then it would be antiquated and could be automatically determined subordinate without further user intervention to resolve a conflict.

A second example synchronization scheme in a decentralized peer-to-peer system is illustrated in the following Table 2. This example helps to illustrate how loser arrays can be modified during use to save space and reduce complexity of the version vectors.

TABLE 2

Second Example Synchronization Scheme

| Line | Laptop-A | Work Computer-B | Home Computer-C | PDA-D | cell Phone-E | Explanation |
|---|---|---|---|---|---|---|
| 1 | {A2} | {A1} | {C1} | {A1} | {A1} | The user modifies datum on laptop A. |
| 2 | {A2} | {A1} | {A1} | {A1} | {A2} | The user syncs laptop A with cell phone E, and then disconnects. |
| 3 | {A2} | {A1B1} | {A1} | {A1} | {A2} | The user modifies the datum on work computer B. |
| 4 | {A2} | {A1B1} | {A2} | {A1} | {A2} | The user syncs laptop A and home computer C. |
| 5 | {A2} | {A1B1} | {A2} | {A1B1} | {A2} | The user syncs work computer B and PDA D without requiring a conflict resolution. |
| 6 | {A2C1} ({A1B1}) | {A2C1} ({A1B1}) | {A2C1} ({A1B1}) | {A2C1} ({A1B1}) | {A2} | The user syncs home computer C and PDA D, and resolves the conflict in favor of computer-C. |
| 7 | {A2C1} ({A1B1}) | {A2C1} ({A1B1}) | {A2C1} ({A1B1}) | {A2C1} ({A1B1}) | {A2C1} ({A1B1}) | The user reconnects laptop A and cell phone E. |
| 8 | {A2C1} ({A1B1}) | {A2B2C1} | {A2C1} ({A1B1}) | {A2C1} ({A1B1}) | {A2C1} ({A1B1}) | Disconnect all stores, modify datum on work computer B. |

Various synchronizations and modifications are shown in lines 1 through 7 of Table 1 according to the techniques disclosed herein. In line 1, for example, each store A-E initially contains a datum with a version vector, and the user modifies the datum in laptop-A when all of the stores A-E are disconnected. The modification in laptop-A, therefore, creates new version vector {A2} for the datum. Because the stores A-E are disconnected, only the version vector for the datum in the laptop-A is changed.

In line 2, the user synchronizes laptop-A with store E (i.e., cell phone) and then disconnects the laptop-A and cell phone-E. Next, the user separately modifies the datum on their work computer-B as shown in line 3. In line 4, the user synchronizes their laptop-A and home computer-C when the user goes home. In a separate sync of line 5, the user synchronizes the work computer-B and PDA-D before going to another meeting out of town.

In line 6, the user connects and synchronizes their home computer-C and PDA-D when returning home. Because C's version vector {A2} and D's version vector {A1B1} conflict, the user is requested to select which version (copy) of the datum should be kept. If the user resolves the conflict in favor of the version of computer-C, and the version vectors are changed accordingly to {A2C1} ({A1B1}), with ({A1B1}) as the losing vector being added to the loser array of the resulting vector. In line 7, the user reconnects and synchronizes laptop-A and cell phone-E, and cell phone-E picks up the version from laptop-A without a conflict alert for the user to resolve.

During use, the loser arrays in the version vectors can be pruned or reduced when a change is made to the datum and a new version entry is added to the version array. This pruning can thereby reduce the amount of information that must be associated with the datum. For example, in line 8 of Table 2, all of the stores are disconnected, and the user then modifies the datum in the work computer-B, which has the version vector with version array {A2 C1} and loser array ({A1 B1}). When work computer-B modifies the datum, the version array is updated to {A2 B2 C1} to reflect that computer-B has modified the datum. In other words, entry "B2" is added to the version array because computer-B has modified the datum and it represents the second (i.e., "2") modification to the datum by computer-B. As shown in line 8, the loser array "({A1 B1})" is dropped when the version vector is updated because "A1 B1" in the loser array is dominated by "A2 B2" in the version array and is therefore antiquated. In other words, the loser array ({A1 B1}) is redundant because the version array {A2 B2 C1} would dominate another version array having the entry "{A1 B1}" in a subsequent synchronization anyway. Therefore, the loser entry of "{A1 B1}" can be dropped altogether from the loser array.

In addition to pruning the loser array when a modification is made as discussed above, the loser arrays can be pruned or reduced directly when synchronizing between stores. Table 3 below shows an example synchronization scheme where loser arrays are reduced during synchronizations.

TABLE 3

Example Synchronization Scheme Where Loser Arrays Reduced

| Line | Store A | Store B | Store C | Explanation |
|---|---|---|---|---|
| 1 | {A1} | {A1} | {A1} | Sync A with B and C and disconnect. |
| 2 | {A1} | {A1B1} | {A1} | Modify datum in B |

TABLE 3-continued

Example Synchronization Scheme Where Loser Arrays Reduced

| Line | Store A | Store B | Store C | Explanation |
|---|---|---|---|---|
| 3 | {A1} | {A1B1} | {A1C1} | Modify datum in C |
| 4 | {A1B1} | {A1B1} | {A1C1} | Sync A with B and disconnect. |
| 5 | {A1B1} | {A1C2}({A1B1}) | {A1C2}({A1B1}) | Sync B and C, resolve conflict for C, and disconnect. |
| 6 | {A2B1} | {A1C2}({A1B1}) | {A1C2}({A1B1}) | Modify A. |
| 7 | {A1B2C2}({A2B1}) | {A1B2C2}({A2B1}) | {A1C2}({A1B1}) | Sync A and B, resolve for B, and disconnect. {A2B1} is added to loser array, and {A1B1} is dropped from loser because it is superseded by {A2B1}. |
| 8 | {A1B2C2}({A2B1}) | {A1B2C2}({A2B1}) | {A1B2C2}({A2B1}) | Sync B and C. Automatic conflict resolution, and A1B1 is dropped from loser array. |

In one example, the loser array is reduced when resolving a conflict, and a new entry is added to the loser array that dominates an existing entry in the loser array. After the various synchronizations and modification made in lines 1-6 of Table 3, stores A and B are synced together in line 7. Before synchronization in line 7, store A has version vector {A2B1}, and store B has version vector {A1C2}({A1B1}), as shown in line 6. When the stores A and B are synchronized in line 7, a conflict arises. If the user resolves the conflict in favor of B, then store A's array {A2B1} will be added to the loser array of store B, which already contains an older loser entry {A1B1}. Because the new entry to the loser array {A2B1} dominates the older entry {A1B1}, the older entry {A1B1} is dropped from the loser array altogether.

In another example, the loser arrays can be reduced when synchronizing without a conflict being present. In line 8, for example, store B is synced with store C. Before synchronization in line 8, store B has version vector {A1B2C2}({A2B1}), and store C has version vector {A1C2}({A1B1}), as shown in line 7. No conflict arises when the stores B and C are synchronized in line 8. Following the synchronization, the following version vector for the stores B and C would be expected:

TABLE 4

| Version Array | Store B's Original Loser Entry | New Loser Entry from Store C | Store C's Original Loser Entry |
|---|---|---|---|
| {A1B2C2} | {A2B1} | {A1C2} | {A1B1}) |

However, the new loser entry {A1C2} from store C is not added to the resulting loser array because it is dominated automatically by the dominant version array {A1B2C2}. Store C's original loser entry {A1B1} is also not added to the resulting loser array, because it is dominated by store B's original loser entry {A2B1} and is dominated by the dominant version array {A1B2C2}. Thus, the resulting version vector for stores B and C after synchronization is {A1B2C2}({A2B1}), which includes the version array and includes only store B's original loser array. The above-described techniques for reducing and pruning the loser array eliminates a number of redundant entries and reduces the overall size of the version vector that must be associated with the datum.

E. Using Atoms for Version Vectors

As may be expected, continued syncing of a datum that frequently changes between stores may result in version vectors increasing in size. To significantly reduce their size, the version vectors can be mapped to atoms (e.g., smaller identifiers, reference numbers, etc.) that require less memory so that the less-memory-intensive atoms can be associated with the datums in place of the larger version vectors. When syncing the datum, the stores need only use the atoms associated with the datum for comparison instead of the longer version vectors.

Because the synching disclosed herein relates to peer-to-peer system in a decentralized or hubless environment, the use of atoms preferably does not use a "master" repository or table at a centralized location for cross-referencing the atoms to version vectors. Instead, each store assigns its own atoms to the version vectors for datums at the store. These assigned atoms are based on the store's own local atomic namespace or scheme, and each store maintains a local persistent table that maps its assigned atoms to the corresponding version vectors and to the known atoms assigned by other stores encountered during synchronizations. Over time, this local table can be built up and become more comprehensive as the store is synchronized with other stores in various synchronizations. Maintaining these tables can use similar techniques known in the art for mapping large strings to unique atoms.

Figure 5A:
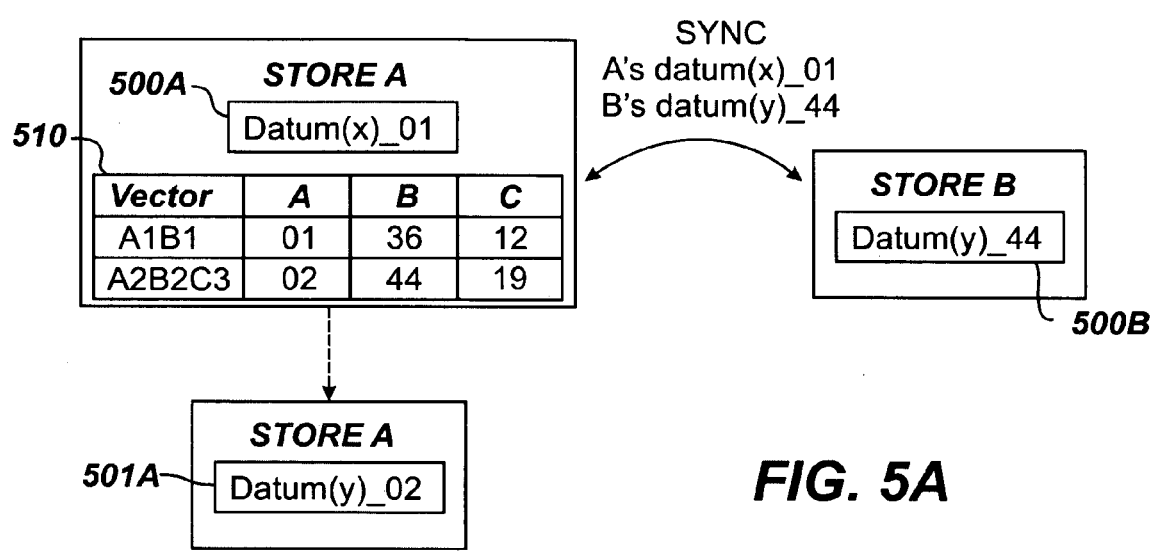
FIG. 5A shows two stores having tables of atoms when synchronizing a datum using those atoms.

As an example, FIG. 5A shows two stores A-B being synchronized. Each store A-B has a copy of the same datum. For example, store A has a datum copy 500A, and store B has a datum copy 500B. Although associated with the same datum, these datum copies 500A-B do not have the same actual value. In other words, A's datum copy 500A has the actual value (x), while B's datum copy 500B has the actual value (y). As a result, each datum copy 500A-B is potentially associated with a different version vector because various stores have changed the datum and synchronized with the stores A and B differently to produce different version vectors. Instead of associating a lengthier version vector to the copies 500A-B, however, each store A-B has assigned its own atom (e.g., A's "01" and B's "44") unique the store's local atomic namespace or scheme. In turn, each store's atoms correspond to an underlying version vector for the datum copy in that store.

To manage the atoms, each store A-B maintains a local persistent table 510 that maps its atoms to the version vectors of various datums at the store including the subject datum copies 500. For example, store A's table 510 maps its atoms in column A to various know version vectors in the table's vector column. Thus, store A's datum copy 500A with value (x) and assigned atom "01" is actually associated with the version vector of {A1B1} as shown in table 510. To manage the atoms for the version vectors at other stores, each store A-B also maps its own atoms to those of other stores. For example, store A lists other atoms in columns B and C of table 510 that those other stores B and C have assigned to the corresponding version vectors. For example, the version vector {A1B1} corresponds to A's atom "01" and also corresponds to B's atom "36" and C's atom "12."

When the stores A and B are synched, store A determines that the atom associated with B's datum copy 500B is "44." Knowing that it is syncing with store B (based on the machine ID or other information exchanged during the syncing process), store A then looks up this atom "44" in its table 510 under column B to determine if B's atom "44" is located in its table 510. Finding that it is, store A determines from the table 510 that A's atom "02" corresponds to store B's atom "44" and determines that A's atom "01" refers to vector {A1B1} and B's atom (i.e., A's atom "02") refers to vector {A2B2C3}. Store A then compares the version vectors referenced by these atoms to determine which datum copy 500A-B is dominant or subordinate or whether a conflict exists requiring user resolution. This comparison of version vectors can use any of the various techniques disclosed herein that use version arrays, loser arrays, identifiers, and version numbers to determine which version (copy) of the datums is dominant or subordinate, to automatically resolve conflicts, and to require user resolution depending on the circumstances.

Based on the comparison, store A in this example determines that B's datum copy 500B is actually dominant over A's datum copy 500A. Based on this, store A replaces its existing datum copy 500A with store B's datum copy 500B having value (y). Ultimately as shown in FIG. 5A, store A assigns its atom "02" to the updated datum copy 501A that corresponds to store B's atom "44" and the version vector {A2B2C3}. As further shown in FIG. 5A, store B's datum copy 500B is not replaced because it is dominant.

In the example of FIG. 5A, store A already knew store B's atom "44" in its table 510. For many synchronizations, this may be the common scenario where the atoms of the syncing stores are already known to one another and known as referring to the corresponding version vectors. In comparing atoms, however, a given store may not already know the atom from another store with which it is synchronizing. To handle such situations, the stores undergo a process of communicating and updating their tables 510 as they synchronize with other stores. Every time two stores are synced, they may exchange all or some of the information about atoms and version vectors in their tables between them, even if the datums copies involved in the sync do not implicate such information. Alternatively, the stores may exchange only information pertinent to each datum in the particular sync.

Figure 5B:
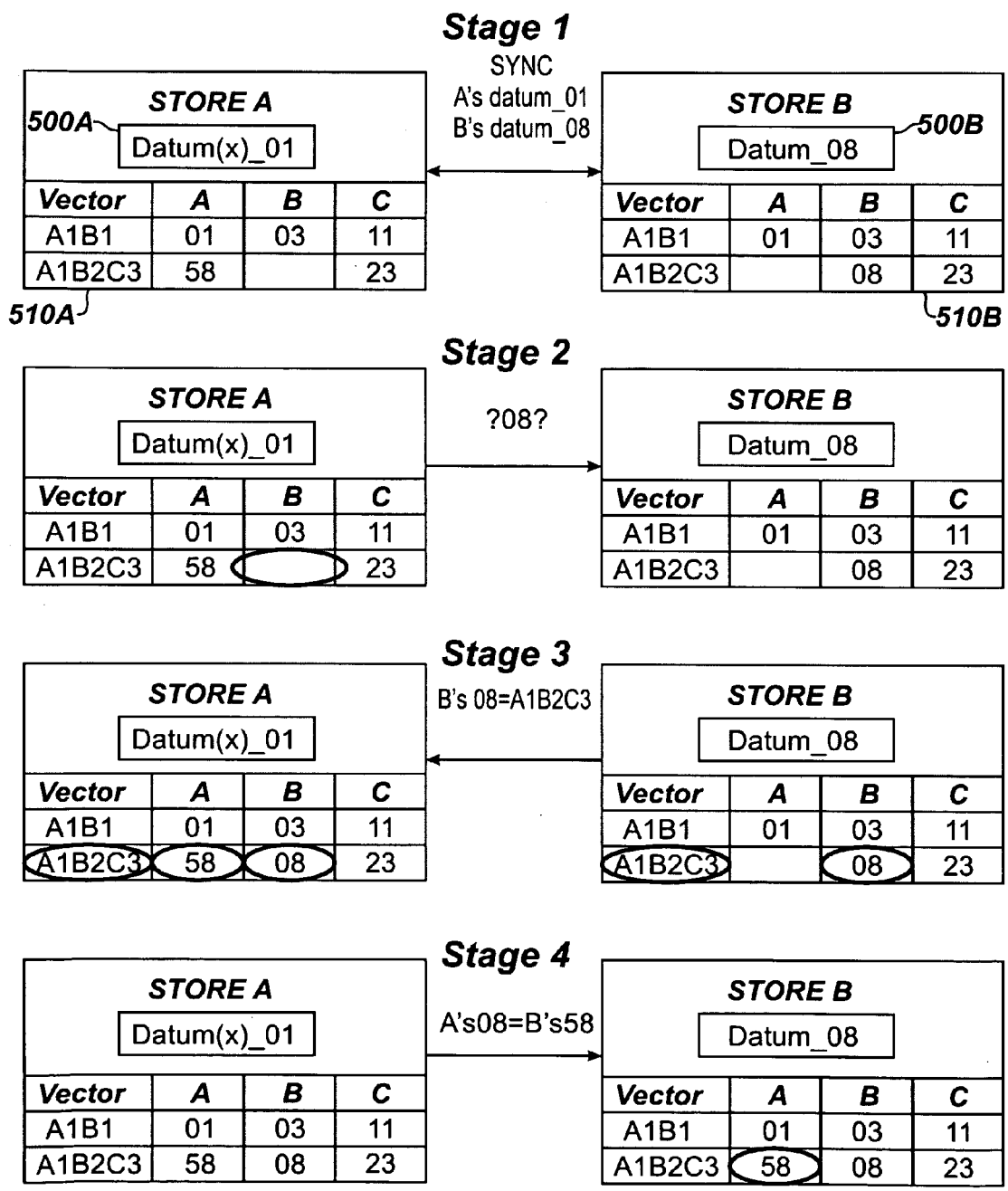
FIG. 5B show two stores synchronizing a datum in which atoms are not know between the stores.

To illustrate how stores can exchange information about version vectors and atoms, FIG. 5B shows stores A and B undergoing various stages 1-4 of synchronization. In this example, store A has a datum copy 500A assigned with store A's atom "01," while store B has a datum copy 500B assigned with store B's atom "08." As shown in store A's table 510A, its atom "01" corresponds to the version vector {A1B1} and for that matter to store B's atom "03" and store C's atom "11." As shown in store B's table 510B, its atom "08" corresponds to the version vector {A1B2C3} and corresponds to store C's atom "23." However, the relationship of store B's atom "08" with store A's atomic namespace is not known to store B nor store A.

When syncing the datum (stage 1), store A determines from its table 510A that it does not know B's atom "08" and requests from store B what the actual version vector for store B's atom "08" is (stage 2). In response, store B communicates that its atom "08" corresponds to the version vector {A1B2C3} (stage 3), although if it knew store A's corresponding atom it could also communicate that instead. Store A searches its table 510A for the communicated version vector {A1B2C3}. If store A already has this version vector (which may have been received from another store), then store A updates its table 510A to show that B's "08" corresponds to A's "58" and to version vector {A1B2C3} (stage 3).

Finally, store A communicates the mapping of A's atom "58" to B's atom "08" to store B, and store B updates its table 510B accordingly (stage 4). In this way, store B will also know when store A refers to A's atom "58" in other synchronization that A's atom "58" corresponds to B's atom "08." Ultimately knowing the version vector {A1B2C3} of store B's datum copy 500B and the version vector {A1B1} of its datum copy 500A, store A can then determine whether its datum copy 500A is subordinate to or dominant over store B's datum copy 500B and can determine whether to update its datum copy 500A or not using the techniques disclosed herein for comparing version vectors.

In the above example, the exchange between stores A and B of information about the atoms and corresponding version vectors is shown in a piecemeal fashion. Although this is one possible implementation, two stores may be synching multiple datums at the same time with the possibility of multiple atoms and version vectors not being known between them. In such a situation, the two stores may exchange a bulk of information in a structured fashion according to common techniques for exchanging information between synchronizing stores.

Figure 5C:
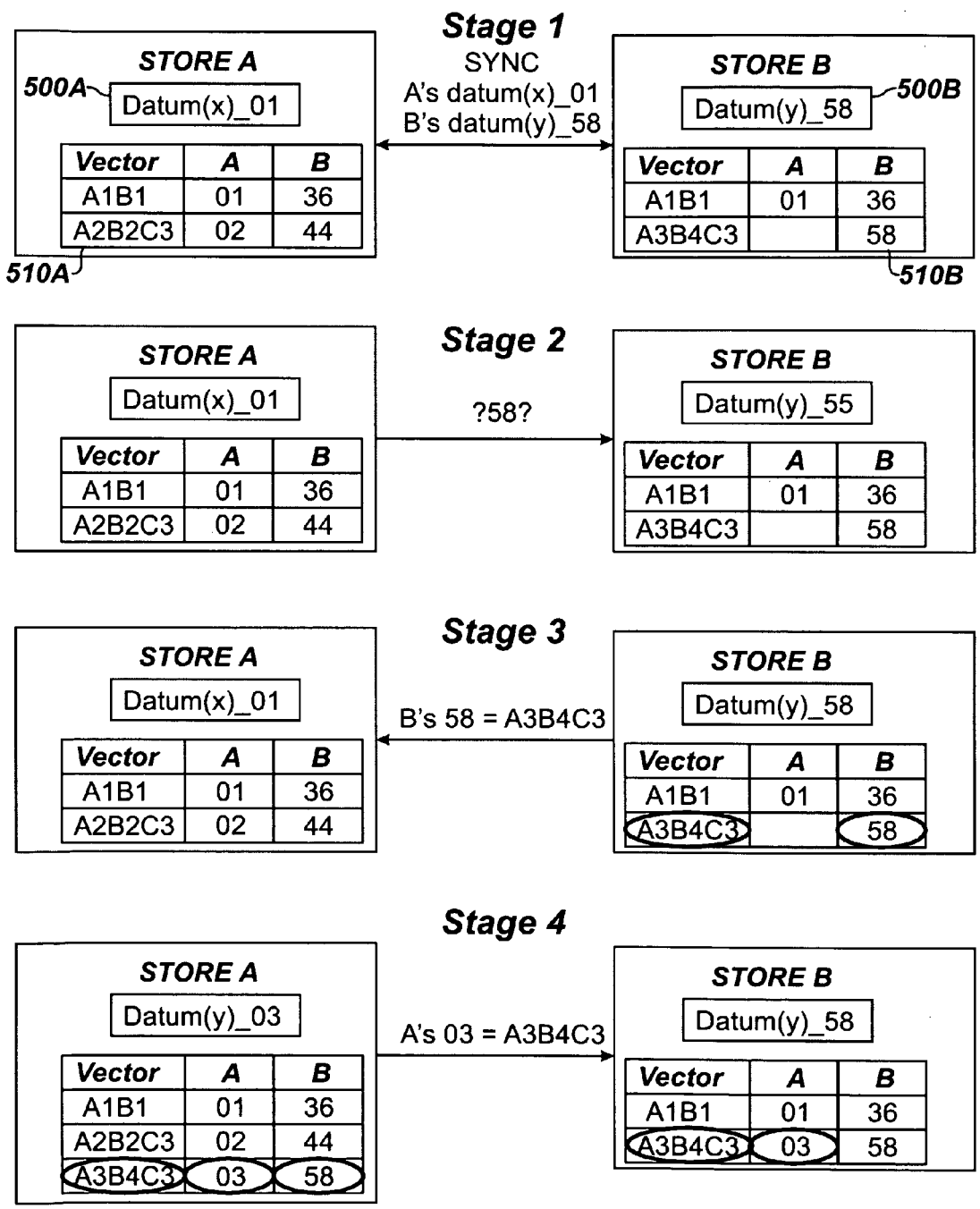
FIG. 5C shows another example of two stores having tables of atoms when synchronizing a datum using those atoms.

In contrast to the above example, there may be situations during synchronizations were a store does not know the other store's atom nor the underlying version vector involved. In such a situation, the store must add the version vector and a new atom to its table during synchronization. In FIG. 5C, for example, store A has a datum copy 500A assigned with store A's atom "01," while store B has a datum copy assigned with store B's atom "58." As shown in store B's table 510B, its atom "58" corresponds to the version vector {A3B4C3}, but this version vector is not known to store A in its table 510A.

When syncing the datum (stage 1), store A determines that it does not recognize B's atom "58" and requests from store B what the actual version vector for store B's atom "58" is (stage 2). In response, store B communicates that its atom "58" corresponds to the version vector {A3B4C3} (stage 3). Store A searches its table 510A for the communicated version vector {A3B4C3}. Because store A does not already have it, store A updates its table 510A in stage 4 by adding the version vector {A3B4C3} to the vector column, assigning a new atom "03" according to store A's atomic namespace or scheme (column A), and cross-references its new atom "03" to store B's atom "58" (column B).

Store A then communicates in stage 4 the correspondence between its new atom "03" to the version vector or to B's atom "58" so store B can then update its table 510B. Knowing the version vector {A3B4C3} of store B's datum copy and the version vector {A1B1} of its datum copy 500A, store A can then determine whether its datum copy 500A is subordinate to or dominant over store B's datum copy 500B and can determine whether to update its datum copy 500A or not using the techniques disclosed herein.

In general, the atoms include data that is considerably smaller in size, storage, or memory requirements than the actual version vectors to which they correspond. In this way, the atoms optimize the sharing of the version vector information when synchronizing datums between stores. Over time, the atoms can be discarded when no more datums are using their underlying version vectors. Eventually, the reference numbers for the atoms can then be reused. In addition, the atoms like the version vectors that they correspond to can be associated with any of the various datums on the store having the corresponding version vector. In this way, for example, store A may have first and second datums with the same version vector {A1B1}, but store A can assign the same atom (e.g., 01) to both of these datums to reference the same underlying version vector.

In the above examples, the atoms have been shown referring essentially to version vectors that lack any loser arrays. However, this has been done to simplify the explanation. In associating the atoms to version vectors, the stores can assign the atoms in a way that accounts for version vectors having both version arrays and loser arrays, as shown in the Table 5 below.

TABLE 5

Version Vectors and Atoms

| | Version Vector | Version Array | Loser Array | Assigned Atom |
|---|---|---|---|---|
| 1 | {A1B1} | A1B1 | N/A | 01 |
| 2 | {A1C2} | A1C2 | N/A | 02 |
| 3 | {A1C2}({A1B1}) | A1C2 | A1B1 | 03 |
| 4 | {A1C2}({A1B1}) | A1C2 = "02" | A1B1 = "01" | 02(01) |

In line 1 of Table 5, for example, a first version vector {A1B1} having only a version array has been assigned atom "01," and a second version vector {A1C2} in line 2 having only a version array has been assigned atom "02." In a first technique shown in line 3 that accounts for loser arrays, the store may assign a unique atom (e.g., "03") in its namespace for a third version vector {A1C2}({A1B1}) that has both the version array and the loser array, essentially seeing this third version vector as unique.

In a second technique shown in line 4 that accounts for loser arrays, however, the store may only assign atoms to version arrays. Because loser arrays are also essentially version arrays that have lost a conflict, the store can then refer to an entire version vector (e.g., {A1C2}({A1B1})) having both the version array {A1C2} and the looser array ({A1B1}) using the two atoms already assigned in its atomic namespace. In this way, the assigned atom "02(01)" in line 4 would include the atom "02" for the version array {A1C2} and would include the atom "01" for the loser array ({A1B1}).

In a third technique not specifically shown in Table 5, looser information may already be incorporated into the version arrays of the version vectors so that the vectors lack loser arrays altogether. This would simplify how the stores assign atoms to version vectors because the stores would not need to account for loser arrays in the vectors. Details of how loser information can be incorporated into the version vectors is provided later in the present disclosure.

The persistent local tables 510 in FIGS. 5A-5C have been described in tabular form for illustrative purposes. In general, the atoms and version vectors can be stored at a given store using any available format, file, structure, indexing, sorting, and the like available in the art for storing and cross-referencing information.

F. Using Atoms for Store Identifiers

Figures 6A, 6B, 6C:
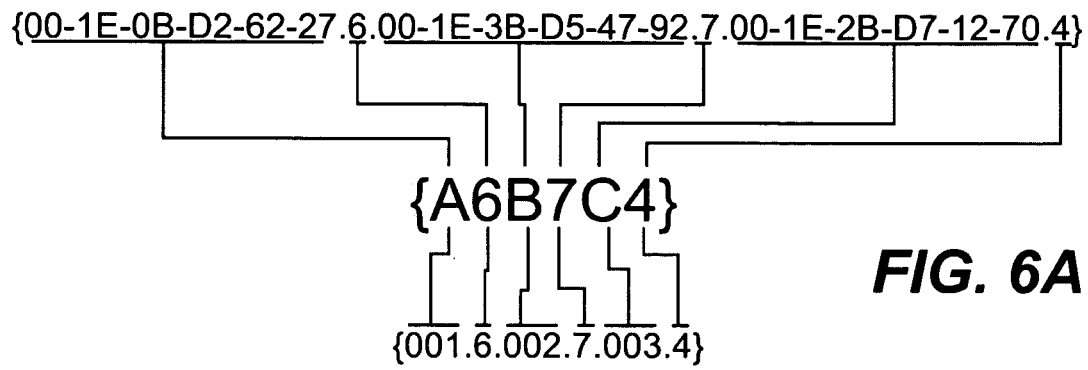
FIG. 6A shows a version vector embodied on the one hand as machine IDs and version numbers and embodied on the other hand as store atoms and version numbers.
FIG. 6B shows a store having a table of store atoms for machine IDs used in version vectors.
FIG. 6C shows stores exchanging information for machine IDs and store atoms.

As noted above, the store identities (e.g., A, B, C, etc.) in the version vectors are represented using unique identifiers, which can be machine IDs, globally unique identification (GUID) numbers, network addresses, etc. When synching stores, the version vectors can become very long due to the multiple store identifiers that may be contained in the version vectors. For example, FIG. 6A shows an illustrative version vector {A6B7C4} identifying three stores (A, B, C) and their incremental version numbers (6, 7, 4). If the unique identifiers (A, B, C) used for the stores are machine IDs and the version numbers are integers, then the illustrative version vector for {A6B7C4} may actually correspond to something like {00-1E-0B-D2-62-27.6.00-1E-3B-D5-47-92.7.00-1E-2B-D7-12-70.4}. Such a version vector would need to be associated with the datum and would become cumbersome as it grows larger with additional synchronization and added version information from additional stores.

Figure 8:
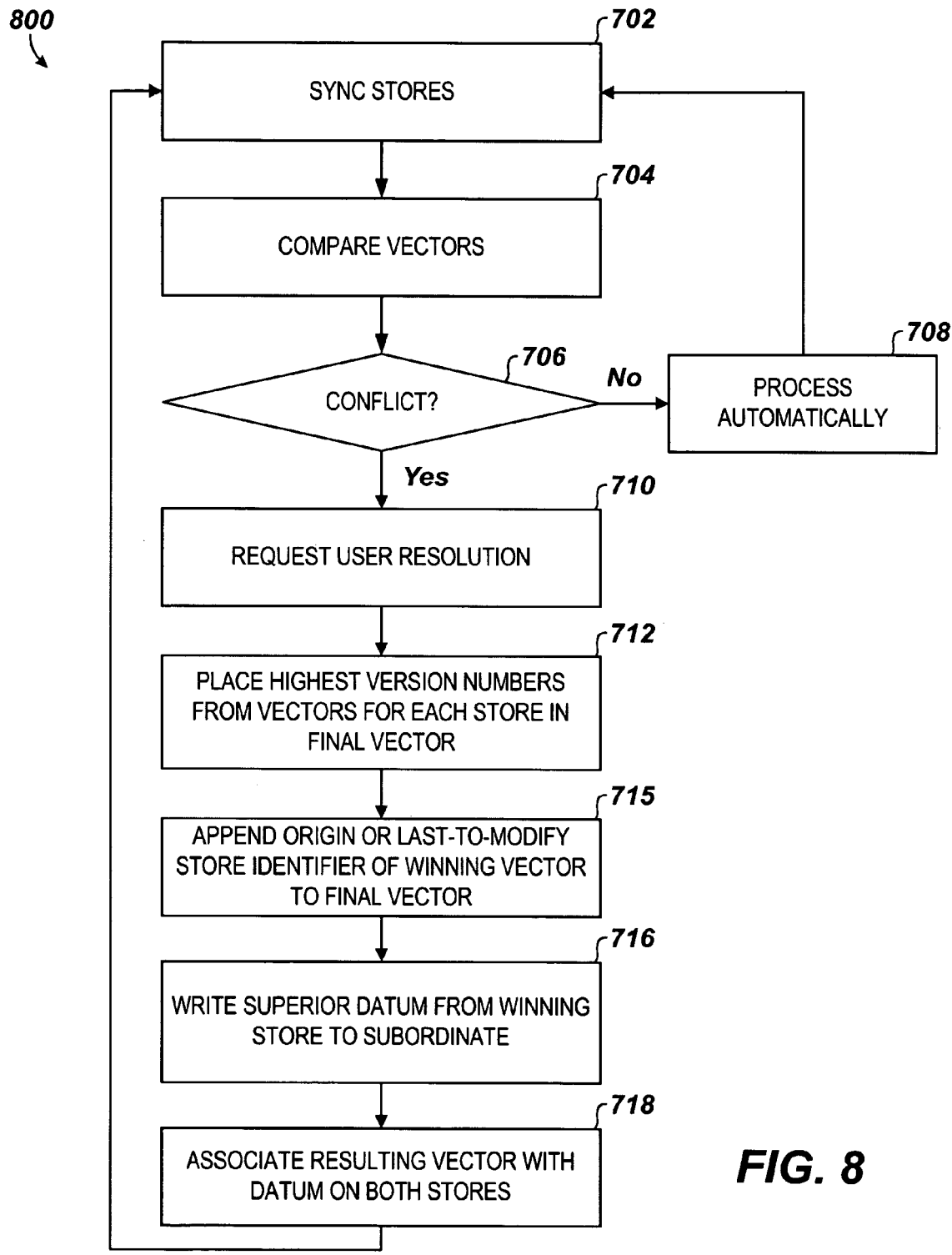
FIG. 8 shows a second technique of synchronizing between stores using version vectors that incorporate loser information into the winning vector of a conflict.

To reduce the size of the version vectors, the store identifiers (A, B, C) can be mapped to smaller atoms so the actual version vectors themselves can remain smaller as well. These smaller atoms can then be maintained at each store using local persistent tables where they are mapped to the actual larger machine IDs, globally unique identification (GUID) numbers, network addresses, etc. Meanwhile, the version vectors associated with the datums being synched actually use the smaller store atoms so that less version information needs to be associated with the datum being synched. For example, FIG. 8A shows how the actual machine IDs for the stores A, B, and C can be mapped to store atoms having triple integers of the form 001, 002, and 003 so that the lengthier version vector {00-1E-0B-D2-62-27.006.00-1E-3B-D5-47-92.007.00-1E-2B-D7-12-70.004} can be reduced to a smaller version vector {001.6.002.7.003.4} with the store atoms (001, 002, 003) used for the machine IDs (00-1E-0B-D2-62-27, 00-1E-3B-D5-47-92, 00-1E-2B-D7-12-70).

FIG. 6B shows how a store A can maintain a mapping table 600 of the smaller store atoms that correspond to the actual store identifiers (e.g., machine IDs) used in the version vectors. As various stores sync with store A, store A can update its table 600 with store atoms and their corresponding machine IDs as new ones are encountered. As shown in FIG. 6C, for example, store D may sync a datum having version vector {A6B7C4D2} with store A. The abbreviated atomic version vector for the datum would be something like {001.006.002.007.003.004.004.002}, for example. If store A does not recognize store D's atom (because store A has never synched with store D although store D has synched with stores B and/or C), then store A may inquire about the identity of store D (i.e., request D's machine ID) and may update its local table 610 to map the store atom (004) for store D with store D's machine ID (00-3E-4C-D5-21-87).

In one implementation, the store atoms can be assigned and communicated from a centralized location having a "main" cross-referencing table of the store atoms and store identifiers. However, such a centralized mechanism may not be suitable for peer-to-peer syncing in a decentralized environment. In another implementation, therefore, the store atoms used for store identifiers could be assigned by each of the stores according to the stores own atomic namespace or scheme so that cross-referencing of store atoms and identifiers could be performed in a manner similar to that discussed previously with reference to cross-referencing version vectors in Section E above.

G. First Technique of Incorporating Loser Information in Version Vectors

As discussed previously in Section A and shown in FIG. 2, version vectors 200 may contain loser arrays 210 that are added to the version vectors 200 when a user has manually reconciled a conflict that cannot be automatically resolved. This loser array 210 is appended to the version array 202 so that any subsequent conflict when syncing the datum copies having the same version array 202 as contained in the loser array 210 can be automatically decided without requiring user intervention. Thus, the loser array 210 and the version arrays it contains may be independently distinguishable from the primary version array 202 of the version vector 200.

Another embodiment for handling loser information in user resolved conflicts uses a single version vector that merges or incorporates the loser information in the version vector without actually reciting an independently distinguishable loser array. In a first technique, conflicting version vectors are merged together into a resulting version vector when a conflict is resolved instead of appending a loser array to the version array in the vector. As discussed below the version value in the resulting version vector for the store that has been chosen as the winner of the conflict is incremented, although another implementation may not increment the version value of the winner.

Figure 7:
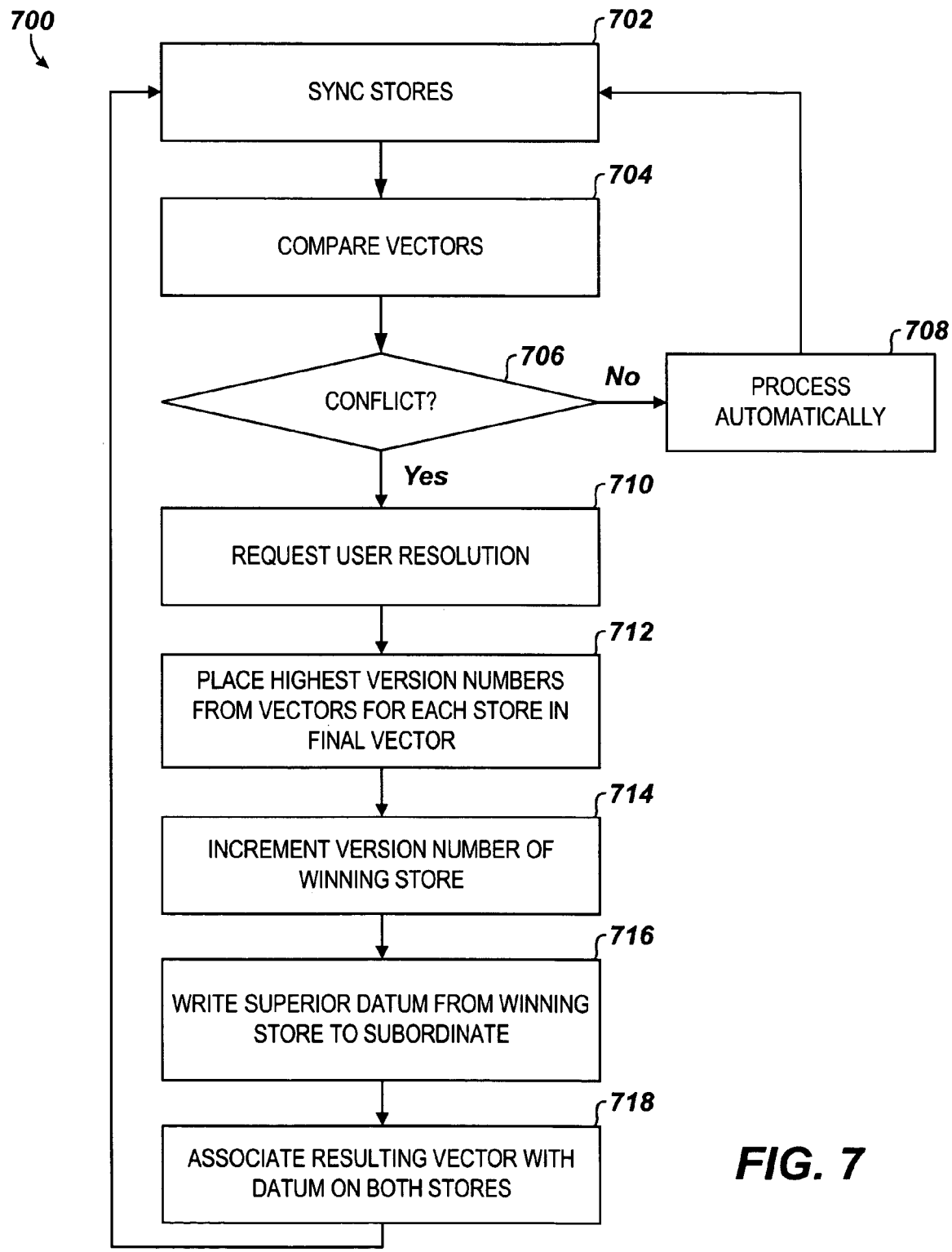
FIG. 7 shows a first technique of synchronizing between stores using version vectors that incorporate loser information into the winning vector of a conflict.

A flowchart example of this first technique 700 is shown in FIG. 7. This technique 700 uses many similar steps to compare version vectors and determine if a conflict exists as those discussed previously. However, the version vectors in this technique 700 do not include the independently distinguishable loser arrays and instead merges conflicting version vectors so loser information is contained in the main body of the vector. Initially, stores are synced (Block 702), and the syncing process compares the vectors of the stores for a datum (Block 704). Based on the comparison, the syncing process determines if a conflict exists (Block 706). If a conflict is not detected from the comparison (Block 708), the syncing process compares the version vectors automatically by selecting the version of the datum having the dominant version vector, copying the dominant version copy to the subordinate copy, and associating the winning vector with the datum on both stores according to the techniques disclosed herein (Block 708).

If there is a conflict that cannot be resolved automatically, however, the syncing process requests user resolution (Block 710). Once the user chooses the version of the datum to maintain on both stores, then the syncing process builds a resulting version vector for the datum so that loser information is incorporated into the resulting version vector. Here, the process obtains each of the identified stores from both of the version vectors and places these identified stores in the resulting version vector. Then, the process places the highest version numbers from both vectors for each store in the resulting vector (Block 712). Once built, the syncing process then increments the version number of the winning store in the resulting vector (Block 714). Finally, as before, the process writes the dominant datum copy that the user selected as the winner to the subordinate store (Block 716) and associates the resulting version vector with the datum on both stores (Block 718).

For example, store A having version vector {A2B1} for a datum may be synced with store B having version vector {A1B2} for the datum. In this synchronization, the conflict cannot be automatically resolved and requires user intervention as at Block 710. If the user resolves the conflict in favor of store A, the previous solution of Section A would add the losing vector (i.e., vector {A1B2} of store B) into a loser array so that the resulting version vector for the datum would be {A2B1 ({A1B2})}.

The current technique 700, however, would first merge the dominant vector {A2B1} with the subordinate vector {A1B2} to produce the resulting vector {A2B2} as in Block 712. As shown, the technique 700 uses all of the store identifiers (A, B) from both the dominant and subordinate vectors in the resulting version vector. In addition, this technique 700 uses the higher version number (i.e., 2 for A and 2 for B) in the resulting version vector for each of those stores regardless of whether the highest number comes from the dominant or subordinate vector. As in Block 714, the technique 700 then increments store A's version number from 2 to 3 because store A won the user resolution. This incrementing would ensure that the final vector is the dominant vector vis-à-vis stores A and B. As a result, the final vector for the datum would be {A3B2}. If store A or B is then synced with another store, this resulting version vector {A3B2} will always trump any vectors that predate it, including {A1}, {A2}, {B1}, {B2}, {A1B1}, {A1B2} (i.e., store B's losing vector), {A2B1} (i.e., store A's previous vector),and {A2B2}, if encountered on the other store.

1. Examples of Version Vectors Incorporating Loser Information

Table 6 below illustrates an example of how the technique operates when synchronizing stores by incorporating the losing vector information into the winning version vector. In this example, when a store has never contributed a change, it is not added in the version vector (lack of D in the vector is the same as D0). Also, in this example, the notations (x), (y) and (z) represent the actual value of the datum, which could be small or actually quite large, i.e., an entire file.

TABLE 6

Example of Version Vectors Incorporating Loser Information

| Sync | A | B | C | D | Explanation |
|---|---|---|---|---|---|
| 1 | {A1} (z) | {A1} (z) | {A1} (z) | {A1} (z) | A creates datum with z, syncs to all peers |
| 2 | {A1B1} (x) | {A1B1} (x) | {A1C1} (y) | {A1C1} (y) | B modifies datum to x, syncs with A. C modifies to y, syncs with D |
| 3 | {A1B1} (x) | {A1B2C1} (x) | {A1B2C1} (x) | {A1C1} (y) | B and C sync and user chooses B as winner |
| 4 | {A1B1C1D1} (y) | {A1B2C1} (x) | {A1B2C1} (x) | {A1B1C1D1} (y) | Sync A and D, choose D (value y from C) as winner |

In sync 1 of this example, store A is used to create a datum having information (z). Thus, store A associates the version vector {A1} with the datum. This datum is synced to all peer stores B, C, and D so they each have the datum with information (z) and version vector {A1}. In sync 2, the user modifies the datum on store B to (x) and then syncs the datum on store B with store A. As a result, stores A and B both have the version vector {A1B1}. The user also modifies the datum on store C to a different value (y) and then syncs the datum with store D so that stores C and D both have the version vector {A1C1}. Thus, sync 2 shows the situation where stores A and B agree and stores C and D agree, but each set is independent.

In sync 3, the user syncs the datum between stores B and C. This conflict cannot be automatically resolved so the user may resolve the conflict in favor of store B. Using the technique of merging the vectors, each store identifier (A, B, C) from both vectors {A1B1} and {A1C1} and the highest version number (1 for A, 1 for B, and 1 for C) from both vectors are incorporated into the resulting vector, and the value of the winner store B is incremented from 1 to 2 to produce the resulting version vector {A1B2C1}. The datum copy from wining store B is implemented on losing store C, and both stores B and C are given the resulting vector. Thus, stores B and C have the version vector {A1B2C1} and the datum has the value (x) from store B.

In sync 4, if the user syncs store A and D, the version vectors cannot resolve the conflict without user intervention. If the user choose store D as the winner with the value (y) of the datum from store C, then the resulting version vector incorporating the loser information in sync 5 is {A1B1C1D1} with datum value (y) in stores A and D. (See FIG. 8D). As shown, the version vector {A1B2C1} with the datum value (x) in stores B and C are different and properly indicate that the underlying datum copies are different from stores A and D.

2. Handling Alias Version Vectors

As shown above, the disclosed technique avoids the need to manage loser arrays in the version vectors as well as avoiding the extra storage needed for them. In some instances, however, different looking version vectors (i.e., alias vectors) may be generated during synchronizations that actually represent the same underlying version of the datum. For example, the datum on a first store with a first version vector may actually contain the value (x), while the datum also containing the same value (x) may have a different (alias) version vector on a second store. Such an alias vector may occur if the version vectors have version information for more than two stores, but would not occur if the version vectors have only version information for one or two stores.

Table 7 below illustrates an example of how the technique of incorporating loser information can produce an alias vector.

Syncs 1 through 3 in Table 7 are the same as discussed previously with reference to Table 6. In sync 4 of Table 7, if the user syncs stores C and D, the version vector of store C wins without needing user conflict resolution and without needing to consult a loser array because the current technique already incorporated the loser vector from the manual resolution in sync 3. If in sync 5, stores D (or C) are synced with store A, then stores D (or C) would win without needing user conflict resolution. However, as can be seen, stores D and A already have the same information (x) in the datum but have version vectors that are aliases of one another. Thus, redundant copying would be performed in sync 5 when the datum on store D is copied to store A, which lost the version comparison. This redundant copying may be of little consequence for a small sized datum, however.

As the above example shows, some redundant data copying may occur during synchronization when alias vectors exit for versions of a datum having the same underlying value between stores. the In these situations, the syncing process may simply copy the datum on one of the stores to the other store because one of the alias vectors would lose to the other, even though the underlying datum contains the same value on both stores. Rather than simply copying the datum, the syncing process could consult the actual values, information, etc. contained in the copies of the datum and compare the values, information, etc. between the stores to see if copying the datum could be avoided. As shown in Table 8 below, for example, stores A through D may at some point after synchronizing have the following version vectors but may have datums with the same value (x).

TABLE 8

| A | B | C | D |
|---|---|---|---|
| {A2B1C1} | {A1B2C1} | {A1B2C1} | {A2B1C1} |
| (x) | (x) | (x) | (x) |

In this situation, the datum is the same, but the version vectors are benignly different on some stores. If store A is synched with store B or C, the syncing process can compare the actual value of the datum before performing a copy operation that may be redundant (which it would in this case because the underlying datum values are the same). By look-

TABLE 7

Example of an Alias Vector Situation

| Sync | A | B | C | D | Explanation |
|---|---|---|---|---|---|
| 1 | {A1} | {A1} | {A1} | {A1} | A creates datum with z, syncs to all peers |
|   | (z) | (z) | (z) | (z) |   |
| 2 | {A1B1} | {A1B1} | {A1C1} | {A1C1} | B modifies datum to x, syncs with A. C modifies to y, syncs |
|   | (x) | (x) | (y) | (y) | with D |
| 3 | {A1B1} | {A1B2C1} | {A1B2C1} | {A1C1} | B and C sync and user chooses B as winner |
|   | (x) | (x) | (x) | (y) |   |
| 4 | {A1B1} | {A1B2C1} | {A1B2C1} | {A1B2C1} | Sync C and D, C wins |
|   | (x) | (x) | (x) | (x) |   |
| 5 | {A1B2C1} | {A1B2C1} | {A1B2C1} | {A1B2C1} | Sync D and A, D wins outright |
|   | (x) | (x) | (x) | (x) |   | ing at the underlying datum values, the syncing process can determine that the value for the datum in store A is the same as in store B or C and would thereby avoid the redundant copying.

Some situations may arise where the existence of an alias vector results in a false conflict between version vectors although the underlying datum values are the same. Table 9 below illustrates an example where there is a false conflict resulting from an alias vector.

TABLE 9

Example of an Alias Vector Situation Resulting in False Conflict

| Sync | A | B | C | D | Explanation |
|---|---|---|---|---|---|
| 1 | {A1} (z) | {A1} (z) | {A1} (z) | {A1} (z) | A creates datum with z, syncs to all peers |
| 2 | {A2} (x) | {A2} (x) | {A1C1} (y) | {A1C1} (y) | A modifies datum to x, syncs with B. C modifies to y, syncs with D |
| 3 | {A2} (x) | {A2B1C1} (x) | {A2B1C1} (x) | {A1C1} (y) | B and C sync and user chooses B as winner |
| 4 | {A3C1} (x) | {A1B2C1} (x) | {A1B2C1} (x) | {A3C1} (x) | Sync A and D, User chooses A as winner. If A and B are now synced, even though the data is same the version vectors look like their in conflict. |

In sync 1, store A is used to create a datum with value (z) and syncs to all peers so that each has the version vector {A1}. In sync 2, store A is used to modify the datum to the value (x) so that the A's vector is {A2}. Stores A and B are synced so that both have the value (x) and the vector {A2}. In addition, store C is used to modify the datum to the value (y) so that the C's vector is {A1C1}. Stores C and D are synced so that both have the value (y) and the vector {A1C1}. In sync 3, stores B and C are synced, producing a conflict. If the user chooses the datum in store B as winner, then stores B and C have the value (x) and the version vector {A2B1C1}.

Finally, in sync 4, stores A and D are synched, producing a conflict between A's vector {A2} and B's vector D's vector {A1C1}. If the user chooses the datum in store A as winner, then stores A and D have the value (x) and the version vector {A3C1} using the technique of incorporating the loser vector {A1C1} into the winning vector {A2} and incrementing the value of the winning store A to produce the resulting vector {A3C1}. If stores A and B are now synced at this point, the underlying datum value (x) is the same, but the version vectors are in a false conflict. In this situation, the syncing process can compare the actual value of the datum before requiring the user to resolve the conflict. By looking at the underlying datum values, the syncing process can determine that the value for the datum in store A is the same as in store B and could avoid presenting the user with a false conflict to resolve.

As expected, some efficiency may be lost because the alias vectors may cause an underlying datum to be redundantly copied if the one vector appears to be superior over another vector even though the underlying datum value is actually the same. Also, efficiency may be lost when the underlying datum values are compared to avoid requiring a user resolution of a false conflict between an alias vector and other vector. For a larger datum such as a song, picture or other large file, comparing or redundantly copying such a large datum would be undesirable. The small savings in size and management achieved by incorporating the loser information in the version vector in a way that can produce alias vectors would be dwarfed by the actual size of the datum anyway. Therefore, the synching process may use the more expensive technique of using loser arrays in the version vectors for lager datums.

If the technique is used for structured data, such as contact information, where a version vector is used for every property in a contact record (e.g., first name, last name, company, each phone number/email/address, etc.), then the savings in the version vector size achieved by eliminating the loser array would be significant, and the additional comparison or copying of the property (which is small) would be negligible. In this case, the potential existence of alias vectors and the redundant copying or comparison that they may be required would be less expensive in processing terms. Furthermore, any additional comparison of the actual values in the copies of the datums would only be necessary when a conflict arises that cannot be resolved automatically as a further attempt to avoid the need for user resolution. As a result, recopying the same value or actually comparing the value of the datums on the stores may be suitable for a structured (e.g., small) datum such as contact information or the like.

H. Second Technique of Incorporating Loser Information in Version Vectors

In the previous technique, loser information is incorporated into the resulting version vector, and the version number of the winning store is incremented, although in an alternative technique the version number of the winning store does not have to be incremented if additional information is maintained. In a second technique 800 shown in FIG. 8, the loser information is incorporated into the resulting version vector using many of the same steps as discussed previously in FIG. 7. However, in contrast to the first technique, the version number of the winning vector is not incremented. To avoid false non-conflicts and issues with alias vectors, this second technique instead appends a store identifier to the final version vector (See Block 715). This store identifier is either the origin store where the data first appeared (if unmodified) or the store identifier of the store where the data was last modified. In the current representations, the origin (last-to-modify) store identifier is shown in the version vector after a colon for illustrative purposes. As an example, a datum created on store A may have the version vector {A1:A}, showing the additional annotation that store A is the origin store or last store to modify the datum.

Table 10 below illustrates an example of how the second technique operates when synchronizing stores by incorporating the losing vector information into the winning version vector without incrementing the winning store and by indicating the origin store or last store to modify the datum.

TABLE 10

Example of Version Vectors Incorporating Loser Information

| Sync | A | B | C | D | Explanation |
|---|---|---|---|---|---|
| 1 | {A1:A} (z) | {A1:A} (z) | {A1:A} (z) | {A1:A} (z) | A creates datum with z, syncs to all peers |
| 2 | {A1B1:B} (x) | {A1B1:B} (x) | {A1C1:C} (y) | {A1C1:C} (y) | B modifies datum to x, syncs with A. C modifies to y, syncs with D |
| 3 | {A1B1:B} (x) | {A1B1C1:B} (x) | {A1B1C1:B} (x) | {A1C1:C} (y) | B and C sync and user chooses B (value x from B) as winner |
| 4A | {A1B1C1:B} (x) | {A1B1C1:B} (x) | {A1B1C1:B} (x) | {A1B1C1:B} (x) | Sync A and D, user chooses A (value x from B) as winner |
| 4B | {A1B1C1:C} (y) | {A1B1C1:B} (x) | {A1B1C1:B} (x) | {A1B1C1:C} (y) | Sync A and D, user chooses D (value y from C) as winner |

In sync 1, store A creates a datum with the value (z) and syncs to all the other stores B, C, and D so that each datum has the version vector of {A1:A} (z). In sync 2, store B modifies the datum's value to (x) and syncs with store A so that stores A and B both have the vector {A1B1:B} (x). Similarly, store C modifies the datum's value to (y) and syncs with store D so that both have the vector {A1C1:C} (y).

In sync 3, stores B and C are synced producing a conflict, and the user resolves the conflict in favor of store B (selecting the value (x) from store B). Thus, stores B and C have the vector {A1B1C1:B} (x). In sync 4A, stores A and D are synced producing a conflict. If the user resolves the conflict in favor of A (selecting the value (x) from store B), then each of the stores A, B, C, and D will have the same datum and the same versions vectors. Thus, the present technique may only need to look at the portion before the colon to do most comparisons when syncing.

As shown in sync 4B, however, if the user had resolved the conflict in favor of store D when syncing stores A and D, then the main portions of the version vectors (i.e., A1B1C1) on each store would be the same even though the actual values of the datum are different (i.e., stores A and D have the value (y) and stores B and C having the value (x)). Here, the second portion of the vector after the colon that identifies the origin store or last store to have modified the datum is used to indicate correctly that a real conflict still exists between the versions of the datum on the stores. Because the portions of the vectors before the colon are identical, the technique instead looks after the colon to determine whether a conflict may exist. Thus, the information after the colon indicates whether there the stores actually have the same data (as in sync 4A) or whether there is actually conflict (as in sync 4B).

With this second technique, the acts of incorporating loser information and appending an origin (or last-to-modify) store identifier to the version vector can avoid issues associated with alias vectors that may arise during synchronizations. Namely, this second technique can avoid the redundant comparison/copying of datum values and the occurrence of false conflicts between vectors even though the underlying datum values are the same.

In a first example, Table 11 below shows how this second technique can avoid the problem of false conflicts produced by alias vectors.

TABLE 11

Example of Version Vectors Incorporating Loser Information and Origin Store as Avoiding False Conflicts

| Sync | A | B | C | D | Explanation |
|---|---|---|---|---|---|
| 1 | {A1:A} (z) | {A1:A} (z) | {A1:A} (z) | {A1:A} (z) | A creates datum with z, syncs to all peers |
| 2 | {A2:A} (x) | {A2:A} (x) | {A1C1:C} (y) | {A1C1:C} (y) | A modifies datum to x, syncs with B. C modifies to y, syncs with D |
| 3 | {A2:A} (x) | {A2C1:A} (x) | {A2C1:A} (x) | {A1C1:C} (y) | B and C sync and user chooses B as winner |
| 4 | {A2C1:A} (x) | {A2C1:A} (x) | {A2C1:A} (x) | {A2C1:A} (x) | Sync A and D, User chooses A as winner. Now all peers have the same version vector and the same datum value |

In sync 1, store A is used to create the datum with value (z) and syncs with all peer stores B, C, and D so that each store has the datum value (z) and version vector {A1:A}. As shown, the information after the colon indicates that store A was the last store to originate or modify the datum's value. In sync 2, store A is used to modify the datum's value to (x), and store A is synced with store B so that stores A and B each have value (x) and vector {A2:A}.

In sync 3, stores B and C are synced, producing a conflict between B's vector {A2:A} and C's vector {A1C1:C}. If the user chooses store B as the winner of the conflict, then the resulting value of the datum will be (x) as found in store B and the resulting version vector will be {A2C1:A}. As shown, this resulting vector incorporates A's winning vector {A2} and B's losing vector {A1C1}, and the resulting vector indicates after the colon that store A is the last to modify datum.

In sync 4, store A and D are synced, producing a conflict between A's vector {A2:A} and C's vector {A1C1:C}. This represents a true conflict because the datum's values are different. If the user chooses store A as the winner of the conflict, then the resulting value of the datum will be A's (x) as found in store A, and the resulting version vector will be {A2C1:A}. As shown, this resulting vector incorporates A's winning vector {A2} and D's losing vector {A1C1}, and the resulting vector indicates after the colon that store A is the last to modify datum. As seen, all stores now have the same version vector {A2C1:A} and the same datum value (x).

Not only can adding the origin (or last-to-modify) store identifier to the version vector avoid false conflicts, Table 12 below shows how this technique can avoid the need to perform a redundant copy of a datum due to the existence of an alias vector.

TABLE 12

First Example of Version Vectors Incorporating Loser Information and Origin Store as Avoiding Redundant Copying

| Sync | A | B | C | D | Explanation |
|---|---|---|---|---|---|
| 1 | {A1} (z) | {A1} (z) | {A1} (z) | {A1} (z) | A creates datum with z, syncs to all peers |
| 2 | {A1B1:B} (x) | {A1B1:B} (x) | {A1C1:C} (y) | {A1C1:C} (y) | B modifies datum to x, syncs with A. C modifies to y, syncs with D |
| 3 | {A1B1:B} (x) | {A1B1C1:B} (x) | {A1B1C1:B} (x) | {A1C1:C} (y) | B and C sync and user chooses B as winner |
| 4 | {A1B1:B} (x) | {A1B1C1:B} (x) | {A1B1C1:B} (x) | {A1B1C1:B} (x) | Sync C and D, C wins |
| 5 | {A1B1C1:B} (x) | {A1B1C1:B} (x) | {A1B1C1:B} (x) | {A1B1C1:B} (x) | Sync D and A, although D has the additional C1, no copy is needed since both A and D's version vectors indicate B made the last mod, and each version vector has B1 |

In sync 1, store A is used to create a datum with value (z) and syncs to all peer stores. In sync 2, store B is used to modify the datum's value to (x) and syncs with store A. Likewise, store C modifies to the datum's value to (y) and syncs with store D. In sync 3, stores B and C synced, producing a conflict. If the user chooses store B as winner, then both store B and C have the version vector {A1B1C1:B} and datum value (x). In sync 4, stores C and D are synced. Based on the vectors, store C's vector {A1B1C1:B} automatically wins over D's vector {A1C1:C} because it includes all the same modifications and at least one addition modification to the datum.

In sync 5, stores A and D are synced so that A's vector {A1B1:B} is compared to D's vector {A1B1C1:B}. Although store D's vector indicates the additional modification entry "C1," there is no need for store D's datum copy to be copied to store A. In essence, the syncing process determines that both store A and D's version vectors indicate that store B made the last modification and each version vector has the same entry "B1" for store B. Based on this, the syncing process can surmise that the additional entry "C1" is present in D's vector has been included due to a conflict resolution but the underlying datum value originally modified at store B remained unchanged. As seen in this example, adding and maintaining the origin (or last-to-modify) store identifier to the version vector can avoid the need to perform a redundant copy when an alias vector situation occurs.

Table 13 below shows another example of how adding the origin store can avoid the need to perform a redundant copy of a datum due to the existence of an alias vector.

In sync 1, store A is used to create a datum with value (z) and syncs to all peer stores. In sync 2, store B is used to modify the datum's value to (x) and syncs with store A. Likewise, store C modifies to the datum's value to (y) and syncs with store D. In sync 3, stores B and C synced, producing a conflict. If the user chooses store C as the winner, then both store B and C have the version vector {A1B1C1:C} and datum value (x). In sync 4, stores C and D are synced so that C's vector {A1B1C1:C} is compared to D's vector {A1C1:C}. Although store C has the additional entry "B1," no redundant copying of C's datum value to D's datum value is needed because both store C and D's version vectors indicate that store C made the last modification and each version vector has the same entry "C1" for store C.

In sync 5, stores A and D are synced so that A's vector {A1B1:B} is compared to D's vector {A1B1C1:C}. Here, store D wins outright in the comparison because it not only includes the additional entry "C1" and the last store C indicated to modify the datum's value corresponds to the same store in the additional entry. As seen in this example, adding and maintaining the origin (or last-to-modify) store identifier to the version vector can avoid the need to perform a redundant copy when an alias vector situation occurs.

As used herein, a datum can be a piece of electronic information, a field, or a collection of data (but treated as a single item for synchronization). For example, a datum can include, but is not limited to, an entry in a directory, such as a profile; an address entry in an address book program; a calendar entry in a calendar program; an image in an imaging program; an entire file; or a portion of a file, such as a character, word, sentence, paragraph, or page in a textual document. As also

TABLE 13

Second Example of Version Vectors Incorporating Loser Information and Origin Store as Avoiding Redundant Copying

| Sync | A | B | C | D | Explanation |
|---|---|---|---|---|---|
| 1 | {A1} (z) | {A1} (z) | {A1} (z) | {A1} (z) | A creates datum with z, syncs to all peers |
| 2 | {A1B1:B} (x) | {A1B1:B} (x) | {A1C1:C} (y) | {A1C1:C} (y) | B modifies datum to x, syncs with A. C modifies to y, syncs with D |
| 3 | {A1B1:B} (x) | {A1B1C1:C} (x) | {A1B1C1:C} (x) | {A1C1:C} (y) | B and C sync and user chooses C as winner |
| 4 | {A1B1:B} (x) | {A1B1C1:C} (x) | {A1B1C1:C} (x) | {A1B1C1:C} (x) | Sync C and D, although C has the additional B1, no copy is needed since both C and D's version vectors indicate C made the last mod, and each version vector has C1 |
| 5 | {A1B1C1:C} (x) | {A1B1C1:C} (x) | {A1B1C1:C} (x) | {A1B1C1:C} (x) | Sync D and A, D wins outright | used herein, a store includes, but is not limited to, a device, machine, access point, repository, computer, hard drive, cell phone, PDA, etc.

Illustrations discussed in the present disclosure may have been described in relation to PIM data and the synchronization of the same. However, embodiments disclosed herein are expressly intended to apply to virtually any kind of data. Some examples of data that may be synchronized using the techniques taught herein are the following: text files; word processing files; files from a file system, media files such as jpegs, mp3, mpeg2, mpeg4, or wav files; records from a database; or any other data file type, whether or not associated with a specific applications.

Any data item being handled during synchronizations can be interrelated to a set of data items on the same device and on multiple devices. For example, PIM data itself generally occurs as personal contacts, calendar entries, notes, journal entries etc. A personal contact card for John Doe may interrelate a phone number, street address, pager number, and a variety of other data items interrelated by their common association with John Doe. Each item of PIM data on a single device may have one or more corresponding data items on one or more other devices. For example, John Doe's street address may have corresponding data items on each of Jane Doe's desktop computer, portable computer, PDA, and telephone. Likewise, if our data were digital photographs, a picture of John Doe on the desktop may have corresponding pictures of John on the PDA, the portable computer, and elsewhere. The synchronization functions on the devices are responsible for providing a common view (as much as possible) between the corresponding data items across many devices.

The illustrative embodiments have also been discussed with reference to various devices such as computers, PDAs, phones or other intelligent devices. Each device may generally be associated with a sync client, which is usually one or more processes resident on the device. In some instances, a first device may have a sync client resident on another device (this is called a Proxy). This may be because the first device is not sufficiently equipped to host a sync client. Alternatively, in a multi-peer system, the synchronization system may use a local proxy for each other peer in order to synchronize all peers even when many peers are not present (the proxy stands in for the missing devices).

The present disclosure amply illustrates to a computer programmer of skill how to make and use the disclosed synchronization techniques. Therefore, programming such techniques, accompanying user interfaces, and other functional aspects is a routine matter to a computer programmer of skill and can be accomplished using many different programming languages and within the context of many different operating systems. In particular, one or more programs can be used across various stores (machines, devices, etc.), systems, and networks to track changes to data and to synchronize the data across the stores. For reference and more specific disclosure, source code for a demonstration program is appended as an exhibit to the incorporated co-pending U.S. patent application Ser. No. 11/157,647. Of course, the disclosed techniques could be ultimately coded into a computer code and stored on a computer-readable media, such as a compact disk, a tape, stored in a volatile or non-volatile memory, etc.

Other synchronization techniques may be found in the following U.S. Patents: U.S. Pat. No. 5,710,922 entitled "Method for Synchronizing and Archiving Information between Computer Systems," which is incorporated herein by reference. In addition, the following pending applications "A Method of Synchronizing Between Three or More Devices" by Toby Paterson and Jerome Lebel, having Ser. No. 10/853,306 and filed May 24, 2004 and "A Method of Synchronizing" by Toby Patterson and Jerome Lebel, having Ser. No. 10/852,926 and filed May 24, 2004 are hereby incorporated by reference.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A synchronization method, comprising:
comparing version vectors when synchronizing a datum between stores, each of the version vectors having a variable number of version entries, containing information concerning at least one previous synchronization, being associated with a copy of the datum in one of the stores and identifying one or more stores that have modified the associated copy of the datum, wherein a datum represents an individual data item for synchronization wherein at least one version vector has at least two version entries, and wherein the information concerning at least one previous synchronization comprises a loser array; and
determining whether a conflict exists if neither one of the version vectors can be determined as subordinate to or dominant over the other version vector based on the version vectors alone,
wherein if the conflict exists, the method comprises:
obtaining a resolution of the conflict resolving one of the copies of the datum as being subordinate to or dominant over the other copy of the datum using the information concerning at least one previous synchronization contained in a version vector under consideration,
merging the version vectors from both the subordinate and dominant copies of the datum together into a resulting version vector without appending one of the version vectors to the other, and
associating the resulting version vector with the dominant copy of the datum in both of the stores.

2. The method of claim 1, wherein determining whether a conflict exists comprises determining whether both of the version vectors identify all of the same stores as having modified the datum.

3. The method of claim 2, wherein if both of the version vectors identify all of the same stores as having modified the datum, the act of determining further comprises:
determining whether all of the same stores identified in a first of the version vectors have modified the datum as much as or more than a second of the version vectors.

4. The method of claim 2, wherein if both of the version vectors do not identify all of the same stores as having modified the datum, the act of determining further comprises:
determining whether all of the stores identified in a first of the version vectors are also identified in a second of the version vectors; and
determining whether all of the same stores identified in the first version vector have modified the datum as much as or more than the second version vector.

5. The method of claim 1, wherein determining whether a conflict exists comprises initiating the conflict if the version vectors are not identical, if the version vectors do not identify all the same stores as modifying the datum, and if all of the same stores identified in one version vector have not modified the datum as much as or more than the other version vector.

6. The method of claim 1, wherein obtaining a resolution of the conflict comprises receiving a user selection indicating one of the copies of the datum as being subordinate to or dominant over the other copy of the datum.

7. The method of claim 1, wherein merging the dominant and subordinate version vectors together into a resulting version vector comprises including each of the stores identified in both the subordinate and dominant version vectors into the resulting version vector.

8. The method of claim 7, wherein merging comprises:
including, for each of the identified stores in the resulting version vector, an indication representing a highest number of times that the identified store has modified the datum.

9. The method of claim 8, wherein merging comprises:
incrementing the indication in the resulting version vector for the identified store having the dominant version vector.

10. The method of claim 1, wherein each of the version vectors includes an indication of the last store that originated the copy of the datum or that has modified the copy of the datum, and wherein merging the subordinate and dominant version vectors together into a resulting version vector comprises including an indication in the resulting version vector that the store having the dominant version vector is the last store that has modified the copy of the datum.

11. The method of claim 10, wherein the indication comprises a unique identifier associated with the last store that has modified the copy of the datum.

12. The method of claim 1, wherein each of the version vectors comprises one or more entries, each of the entries having an identifier and a value, the identifier identifying one of the stores that has modified the datum, the value indicating a number of modifications to the datum by the store identified by the identifier.

13. The method of claim 12, wherein the identifier comprises a machine identification, a globally unique identification file, a network address, an Internet protocol address, an Ethernet address, or a globally unique identification differentiating the stores.

14. The method of claim 12, wherein the value comprises a monotonically increasing integer.

15. The method of claim 12, wherein merging the subordinate and dominant version vectors together into a resulting version vector comprises:
including each of the identifiers from both the subordinate and dominant version vectors in the resulting version vector; and
including, for each of the identifiers in the resulting version vector, a highest value for the associated identifier from either the subordinate or dominant version vector.

16. The method of claim 12, wherein merging comprises:
incrementing the highest value in the resulting version vector for the identifier of the store having the dominant version vector.

17. The method of claim 12, further comprising initiating the conflict if the version vectors are not identical, the version vectors do not have all the same identifiers, and one of the version vectors does not contain all of the identifiers with equal or greater values of those in the other version vector.

18. The method of claim 1, wherein determining whether a conflict exists comprises determining that the version vectors are identical, and wherein the method further comprises maintaining the copies of the datum and the version vectors in both of the store.

19. The method of claim 1, wherein if the conflict does not exist, the method comprises:
determining one of the version vectors as a subordinate version vector and the other of the version vector as a dominant version vector based on the comparison,
replacing the copy of the datum having the subordinate version vector with the copy of the datum having the dominant version vector, and
associating the dominant version vector with the copies of the datum at both of the stores.

20. A computer-readable device having computer executable instructions stored thereon for performing a method of synchronizing a datum between a plurality of stores, the method comprising:
comparing version vectors when synchronizing a datum between stores, each of the version vectors having a variable number of version entries, containing information concerning at least one previous synchronization, being associated with a copy of the datum in one of the stores and identifying one or more stores that have modified the associated copy of the datum, wherein a datum represents an individual data item for synchronization, wherein at least one version vector has at least two version entries, and wherein the information concerning at least one previous synchronization comprises a loser array; and
determining whether a conflict exists if neither one of the version vectors can be determined as subordinate to or dominant over the other version vector based on the version vectors alone,
wherein if the conflict exists, the method comprises:
obtaining a resolution of the conflict resolving one of the copies of the datum as being subordinate to or dominant over the other copy of the datum using the information concerning at least one previous synchronization contained in a version vector under consideration,
merging the version vectors from both the subordinate and dominant copies of the datum together into a resulting version vector without appending one of the version vectors to the other, and
associating the resulting version vector with the dominant copy of the datum in both of the stores.

21. The computer-readable device of claim 20, wherein determining whether a conflict exists comprises determining whether both of the version vectors identify all of the same stores as having modified the datum.

22. The computer-readable device of claim 21, wherein if both of the version vectors identify all of the same stores as having modified the datum, the act of determining further comprises:
determining whether all of the same stores identified in a first of the version vectors have modified the datum as much as or more than a second of the version vectors.

23. The computer-readable device of claim 21, wherein if both of the version vectors do not identify all of the same stores as having modified the datum, the act of determining further comprises:
determining whether all of the stores identified in a first of the version vectors are also identified in a second of the version vectors; and
determining whether all of the same stores identified in the first version vector have modified the datum as much as or more than the second version vector.

24. The computer-readable device of claim 20, wherein merging the dominant and subordinate version vectors together into a resulting version vector comprises including each of the stores identified in both the subordinate and dominant version vectors into the resulting version vector.

25. The computer-readable device of claim 20, wherein each of the version vectors includes an indication of the last store that originated the copy of the datum or that has modified the copy of the datum, and wherein merging the subordinate and dominant version vectors together into a resulting version vector comprises including an indication in the resulting version vector that the store having the dominant version vector is the last store that has modified the copy of the datum.

26. The computer-readable device of claim 20, wherein each of the version vectors comprises one or more entries, each of the entries having an identifier and a value, the identifier identifying one of the stores that has modified the datum, the value indicating a number of modifications to the datum by the store identified by the identifier.

27. The computer-readable device of claim 20, wherein if the conflict does not exist, the method comprises:
   determining one of the version vectors as a subordinate version vector and the other of the version vector as a dominant version vector based on the comparison,
   replacing the copy of the datum having the subordinate version vector with the copy of the datum having the dominant version vector, and
   associating the dominant version vector with the copies of the datum at both of the stores.

28. A first device capable of synchronizing, the first device comprising:
   memory for storing a first copy of a datum and a first version vector associated with the first copy, the first version vector having a variable number of entries, containing information concerning at least one previous synchronization and identifying one or more stores that have modified the first copy, wherein a datum represents an individual data item for synchronization, wherein the first version vector has at least two version entries, and wherein the information concerning at least one previous synchronization comprises a loser array;
   a processor in communication with the memory and configured to:
      compare the first version vector to a second version vector when synchronizing the datum with a second device, the second version vector identifying one or more stores that have modified a second copy of the datum, and
      determine whether a conflict exists if neither one of the version vectors can be determined as subordinate to or dominant over the other version vector based on the version vectors alone,
   wherein if the conflict exists, the processor is configured to:
      obtain a resolution of the conflict resolving one of the copies of the datum as being subordinate to or dominant over the other copy of the datum using the information concerning at least one previous synchronization contained in the first version vector, and
      associate a resulting version vector with a resulting copy of the datum in the memory, the resulting version vector merging the first and second version vectors together without appending one of the version vectors to the other, the resulting copy being the copy of the datum resolved as dominant.

29. The first device of claim 28, wherein determining whether a conflict exists comprises determining whether both of the version vectors identify all of the same stores as having modified the datum.

30. The first device of claim 29, wherein if both of the version vectors identify all of the same stores as having modified the datum, the act of determining further comprises:
   determining whether all of the same stores identified in a first of the version vectors have modified the datum as much as or more than a second of the version vectors.

31. The first device of claim 29, wherein if both of the version vectors do not identify all of the same stores as having modified the datum, the act of determining further comprises:
   determining whether all of the stores identified in a first of the version vectors are also identified in a second of the version vectors; and
   determining whether all of the same stores identified in the first version vector have modified the datum as much as or more than the second version vector.

32. The first device of claim 28, wherein merging the dominant and subordinate version vectors together into a resulting version vector comprises including each of the stores identified in both the subordinate and dominant version vectors into the resulting version vector.

33. The first device of claim 28, wherein each of the version vectors includes an indication of the last store that originated the copy of the datum or that has modified the copy of the datum, and wherein merging the subordinate and dominant version vectors together into a resulting version vector comprises including an indication in the resulting version vector that the store having the dominant version vector is the last store that has modified the copy of the datum.

34. The first device of claim 28, wherein each of the version vectors comprises one or more entries, each of the entries having an identifier and a value, the identifier identifying one of the stores that has modified the datum, the value indicating a number of modifications to the datum by the store identified by the identifier.

35. The first device of claim 28, wherein if the conflict does not exist, the processor is configured to:
   determine one of the version vectors as a subordinate version vector and the other of the version vector as a dominant version vector based on the comparison,
   replace the copy of the datum having the subordinate version vector with the copy of the datum having the dominant version vector, and
   associate the dominant version vector with the copies of the datum at both of the stores.

* * * * *